(12) United States Patent
Matsubayashi et al.

(10) Patent No.: US 9,842,070 B2
(45) Date of Patent: Dec. 12, 2017

(54) STORAGE APPARATUS, CONTROL APPARATUS AND COMPUTER-READABLE RECORDING MEDIUM HAVING STORED THEREIN CONTROL PROGRAM

(71) Applicant: FUJITSU LIMITED, Kawasaki-shi, Kanagawa (JP)

(72) Inventors: Hirokazu Matsubayashi, Kawasaki (JP); Shoji Oshima, Kawasaki (JP); Tatsuhiko Machida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 130 days.

(21) Appl. No.: 15/068,675

(22) Filed: Mar. 14, 2016

(65) Prior Publication Data

US 2016/0321199 A1 Nov. 3, 2016

(30) Foreign Application Priority Data

Apr. 30, 2015 (JP) ................................. 2015-093637

(51) Int. Cl.
*G06F 13/368* (2006.01)
*G06F 13/16* (2006.01)
*G06F 13/40* (2006.01)

(52) U.S. Cl.
CPC ...... *G06F 13/1668* (2013.01); *G06F 13/4027* (2013.01); *G06F 13/4068* (2013.01)

(58) Field of Classification Search
None
See application file for complete search history.

(56) References Cited

U.S. PATENT DOCUMENTS

| 5,586,250 | A | * | 12/1996 | Carbonneau | .......... | G06F 3/0607 |
| | | | | | | 714/44 |
| 6,112,311 | A | * | 8/2000 | Beardsley | ........... | G06F 11/2005 |
| | | | | | | 710/8 |
| 6,408,343 | B1 | * | 6/2002 | Erickson | ............. | G06F 11/2092 |
| | | | | | | 710/15 |

(Continued)

FOREIGN PATENT DOCUMENTS

| JP | 2005-122763 | 5/2005 |
| JP | 2006-155392 | 6/2006 |

(Continued)

*Primary Examiner* — Elias Mamo
(74) *Attorney, Agent, or Firm* — Fujitsu Patent Center

(57) ABSTRACT

A storage apparatus includes a plurality of control devices configured to control access a plurality of storage devices, and a relay apparatus including a plurality of coupling devices, each of which is configured to couple the control devices so as to be communicable with each other. The relay apparatus includes, for each coupling device, a monitoring controller configured to perform monitoring of the relay apparatus. A first monitoring controller provided in a first coupling device from among the coupling devices notifies, when the first monitoring controller detects an abnormal state in the relay apparatus, a first control device from among the control devices of information relating to the abnormal state detected by the first monitoring controller. The first control device performs a decoupling process that decouples an abnormal part from the relay apparatus based on the information relating to the abnormal state received from the first monitoring controller.

10 Claims, 10 Drawing Sheets

(56) References Cited

U.S. PATENT DOCUMENTS

| | | | |
|---|---|---|---|
| 7,610,509 B2 * | 10/2009 | Abe | G06F 11/2005 714/11 |
| 2006/0117159 A1 | 6/2006 | Ohara et al. | |
| 2007/0070975 A1 | 3/2007 | Otani et al. | |
| 2008/0126851 A1 * | 5/2008 | Zadigian | G06F 11/2092 714/6.32 |
| 2010/0077252 A1 * | 3/2010 | Siewert | G06F 11/008 714/6.12 |
| 2014/0223097 A1 | 8/2014 | Ohara et al. | |
| 2015/0019903 A1 * | 1/2015 | Arroyo | G06F 11/2002 714/5.1 |

FOREIGN PATENT DOCUMENTS

| | | |
|---|---|---|
| JP | 2006-209549 | 8/2006 |
| JP | 2007-87266 | 4/2007 |

\* cited by examiner

FIG. 7

EXAMPLE OF CONFIGURATION INFORMATION

| UNIT | STATUS |
| --- | --- |
| MP BRIDGE | online |
| MP#0 | online |
| MP#1 | online |
| MP-EXT#0 | online |
| MP-EXT#1 | online |
| MP-PSU#0 | online |
| MP-PSU#1 | online |
| FRT#0 | online |
| FRT#1 | online |
| FRT#2 | online |
| FRT#3 | online |
| SVC#0 | online |
| SVC#1 | online |
| FANU#0 | online |
| FANU#1 | online |
| FANU#2 | online |
| FANU#3 | online |
| PSU#0 | online |
| PSU#1 | online |
| PSU#2 | online |
| PSU#3 | online |
| ⋮ | ⋮ |

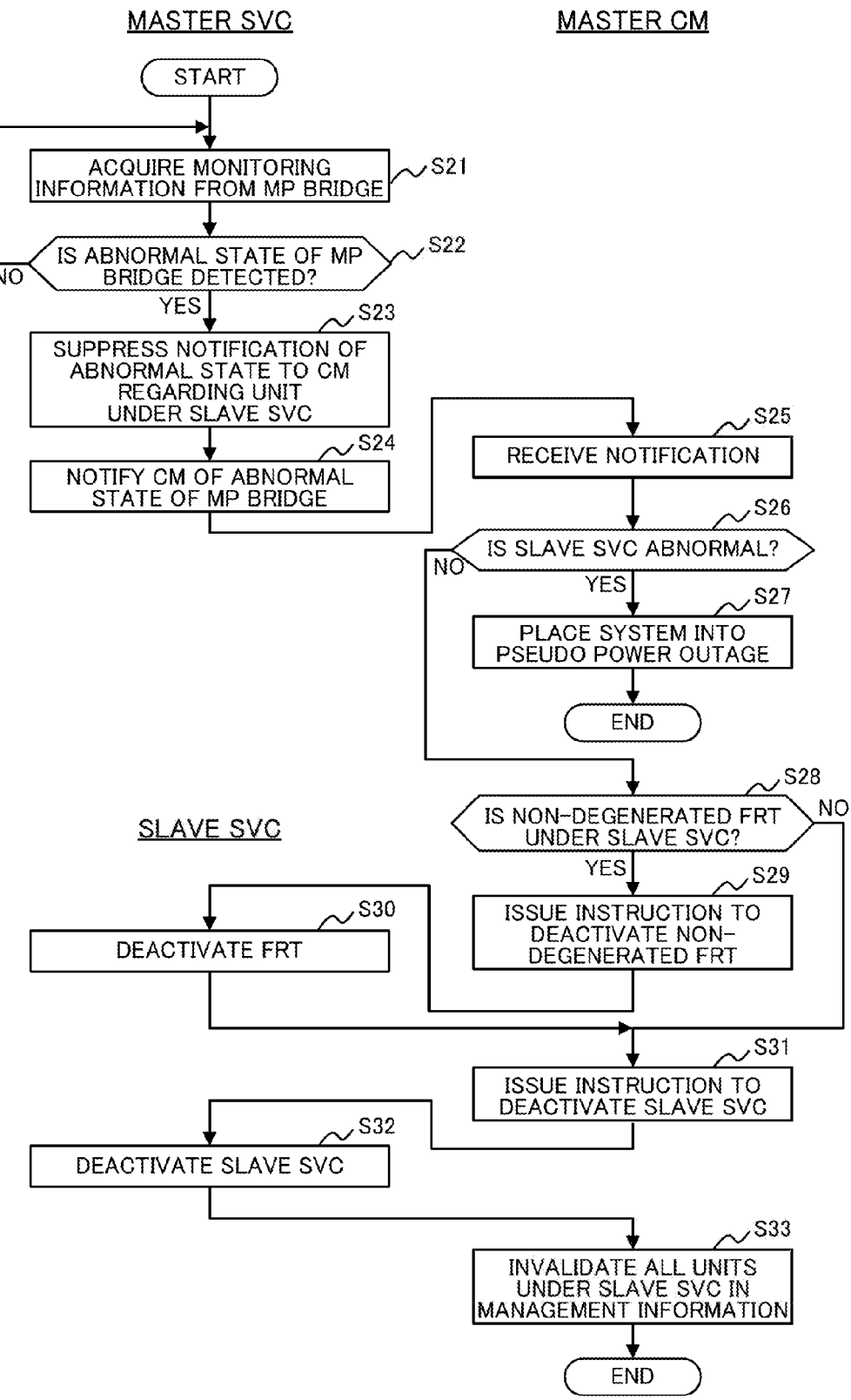

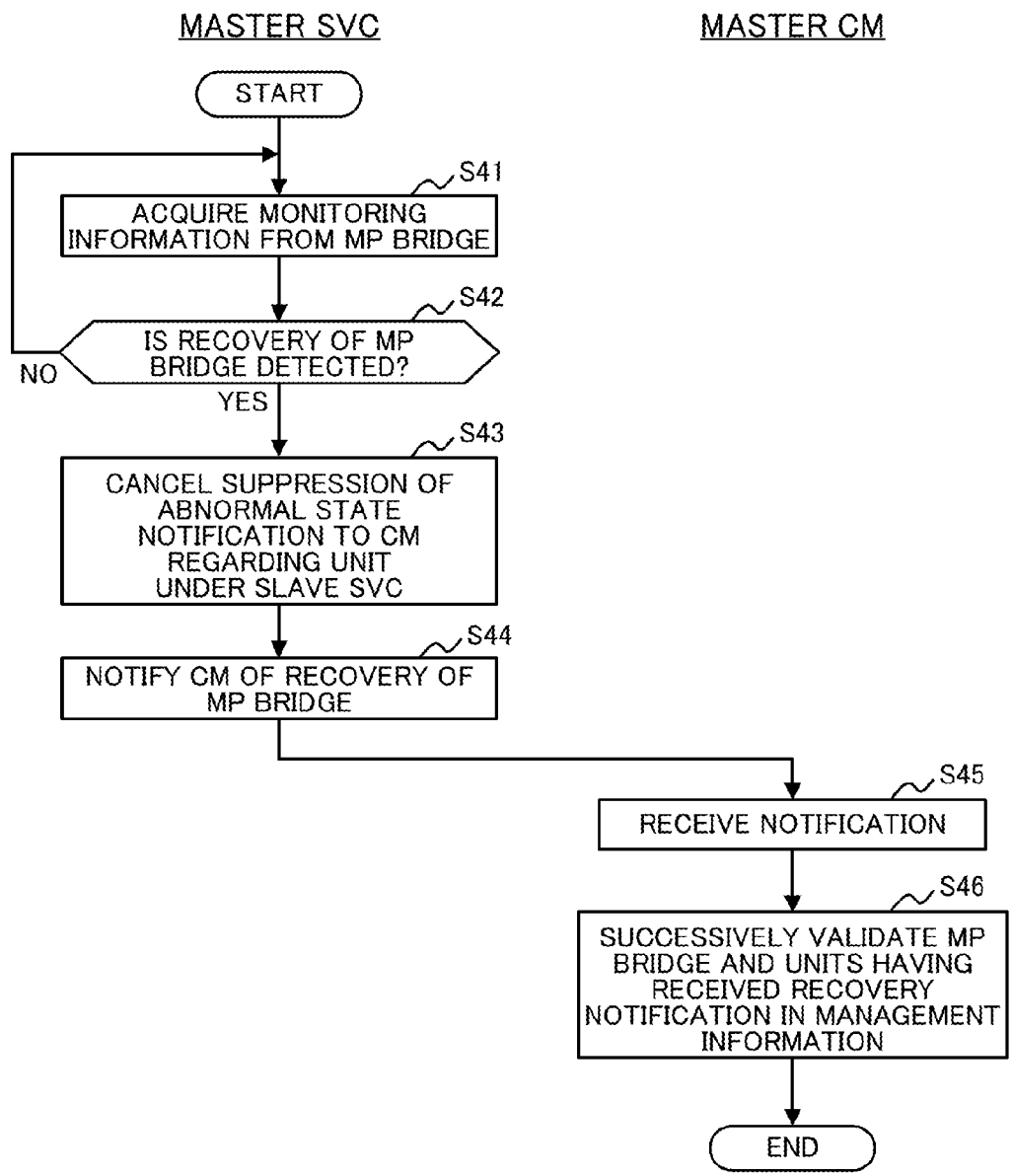

STORAGE APPARATUS, CONTROL APPARATUS AND COMPUTER-READABLE RECORDING MEDIUM HAVING STORED THEREIN CONTROL PROGRAM

CROSS-REFERENCE TO RELATED APPLICATION

This application is based upon and claims the benefit of priority of the prior Japanese Patent Application No. 2015-093637, filed on Apr. 30, 2015, the entire contents of which are incorporated herein by reference.

FIELD

The present embodiment relates to a storage apparatus, a control apparatus and a computer-readable recording medium having stored therein a control program.

BACKGROUND

It is known that a storage apparatus including a plurality of storage devices includes a control apparatus that performs access control between a host apparatus and the storage devices (for example, refer to Patent Documents 1 and 2). A storage apparatus sometimes includes a plurality of apparatus, cables or the like of the same type, and makes control devices, paths between the control devices and storage devices and so forth redundant to achieve improvement in availability or performance of the system.

Where a plurality of control apparatus, for example, a plurality of controller modules (CMs), are provided, also it is known that a storage apparatus includes a switch unit for allowing communication between the CMs (for example, refer to Patent Documents 3 and 4). Also with regard to the switch unit, a plurality of switch units may be provided in a storage device so as to be redundant in order to improve the availability and the performance of the system.

It is to be noted that also it is known that, in the storage apparatus described above, the plurality of switch units are coupled to a back panel provided in the storage apparatus (for example, refer to Patent Document 4).

[Patent Document 1] Japanese Laid-Open Patent Application No. 2005-122763

[Patent Document 2] Japanese Laid-Open Patent Application No. 2007-087266

[Patent Document 3] Japanese Laid-Open Patent Application No. 2006-155392

[Patent Document 4] Japanese Laid-Open Patent Application No. 2006-209549

In the storage apparatus described above, since the back panel is not made redundant, if the back panel fails, then operation of the storage apparatus is stopped. For example, after the power supply to the entire storage apparatus is turned off, exchange of the back panel is performed.

In this manner, a storage apparatus that includes a plurality of control devices is sometimes degraded in availability.

SUMMARY

According to an aspect of the embodiments, a storage apparatus includes a plurality of control devices configured to control access from an upper apparatus to a plurality of storage devices, and a relay apparatus including a plurality of coupling devices, each of the plurality of coupling devices being configured to couple the plurality of control devices so as to be communicable with each other. The relay apparatus includes, for each of the coupling devices, a monitoring controller configured to perform monitoring of the relay apparatus. A first monitoring controller provided in a first coupling device from among the plurality of coupling devices notifies, when the first monitoring controller detects an abnormal state in the relay apparatus, a first control device from among the plurality of control devices of information relating to the abnormal state detected by the first monitoring controller. The first control device performs a decoupling process that decouples an abnormal part from the relay apparatus based on the information relating to the abnormal state received from the first monitoring controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a view depicting an example of configuration information managed by the CM;

FIG. 9 is a flow chart illustrating an example of a process when the MP bridge in the storage apparatus according to the embodiment becomes abnormal; and FIG. 10 is a flow chart illustrating an example of a process when the MP bridge in the storage apparatus according to the embodiment is recovered.

DESCRIPTION OF EMBODIMENTS

Figure 1:
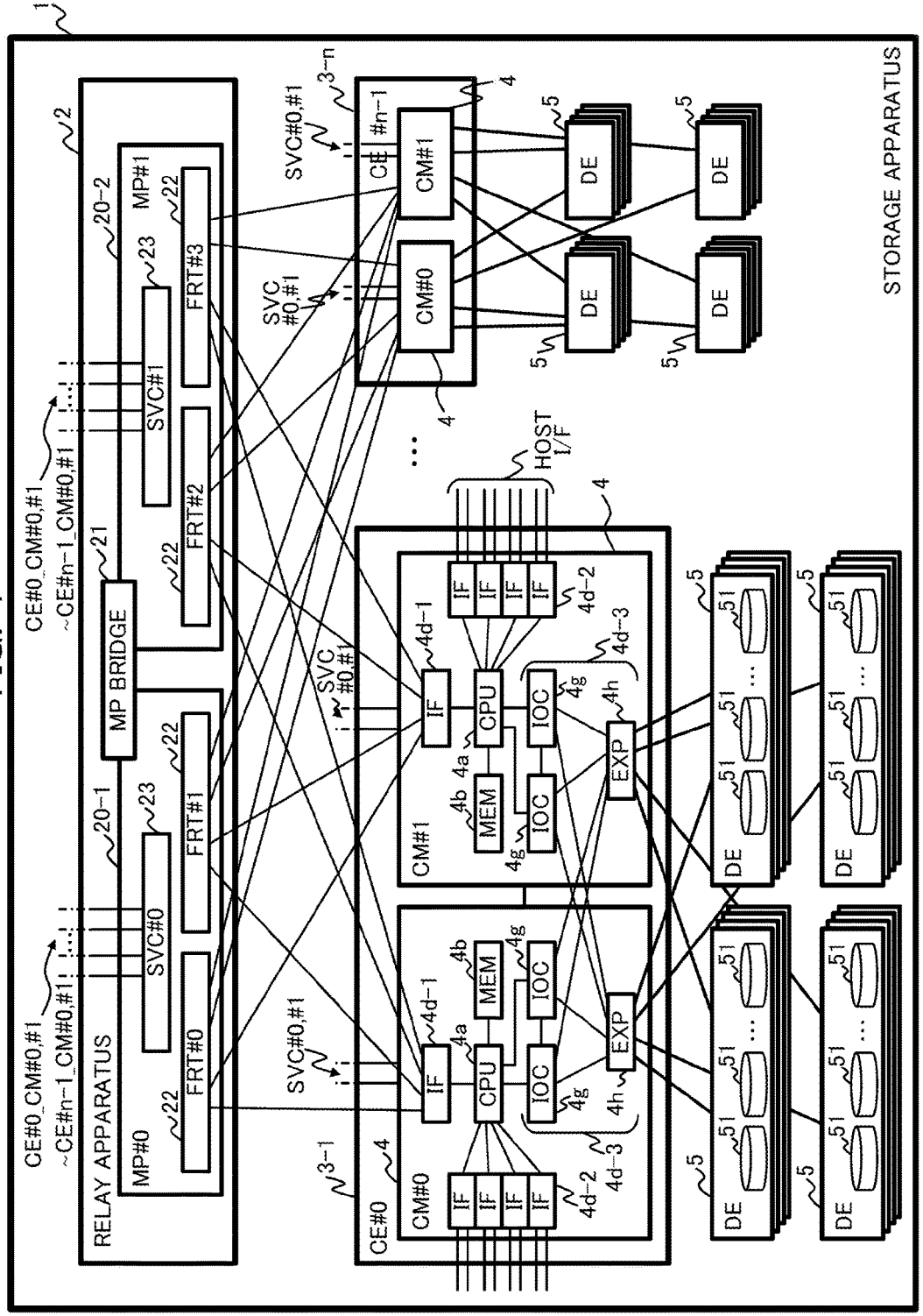
FIG. 1 is a view depicting an example of a configuration of a storage apparatus as an example of an embodiment.

In the following, an embodiment of the present disclosure is described with reference to the drawings. However, the embodiment hereinafter described is illustrative to the end, and there is no intention to eliminate various modifications and applications of the technique not presented explicitly in the following description. In other words, the embodiment can be carried out in various modified forms without departing from the scope thereof. It is to be noted that, unless otherwise specified, like elements to those in the drawings used in the embodiment described below are denoted by like reference characters.

[1] Embodiment

[1-1] Example of Configuration of Storage Apparatus

FIG. 1 is a view depicting an example of a configuration of a storage apparatus 1 as an example of an embodiment. As depicted in FIG. 1, the storage apparatus 1 may exemplarily include a relay apparatus 2, one or more (in FIG. 1, n; n is a natural number) controller enclosures (CEs) 3-1 to 3-n and a plurality of drive enclosures (DEs) 5. It is to be noted that, where the CEs 3-1 to 3-n are not distinguished from each other, each CE is represented simply as CE 3. Further, the CEs 3-1 to 3-n are sometimes referred to individually as CE #0 to CE #n−1.

In the storage apparatus 1, a plurality of storage devices 51 may be incorporated in each DE 5 and a storage region of the storage devices 51 may be provided to a host apparatus (not depicted). For example, the storage apparatus 1 may store data in a dispersed or redundant state into the plurality of storage devices 51 using Redundant Arrays of Inexpensive Disks (RAID). It is to be noted that the CE 3 may include such storage devices 51 therein.

The CE 3 is an example of a control housing that is coupled with the relay apparatus 2 and the DEs 5 and performs various kinds of control. The CE 3 may exemplarily include a plurality of (two in FIG. 1) CMs 4. In the following description, the CMs 4 in the CE 3 are sometimes referred to as CM #0 and CM #1. It is to be noted that the CEs 3-1 to 3-n may be configured similarly to each other, and also the CMs 4 may be configured similarly to the other CMs 4. The following description is given taking the CE 3-1 (and the CMs 4) as an example.

Each CM 4 is an example of a control device (controller) or an information processing apparatus (computer) that controls access from a host apparatus to the plurality of storage devices 51.

In the example of FIG. 1, a CM 4 according to the embodiment is redundant (for example, duplexed) with respect to the other CM 4 in each CE 3. The CMs 4 may be coupled with each other by a cable such as, for example, a SAS cable in compliance with Small Computer System Interface (SCSI). The SAS is an abbreviation of Serial Attached SCSI. It is to be noted that, in the example of FIG. 1, each CM 4 in the CE 2 is coupleddirectlyor indirectly with the DEs 5 corresponding to the CE 3.

Further, in the embodiment, the plurality of CMs 4 in the storage apparatus 1 may include a master CM 4. The master CM 4 mayperform various kinds of control relating to the storage apparatus 1 in response to a request from the host apparatus, the relay apparatus 2, a different CM 4 (slave CM 4) or the like.

Further, the plurality of CMs 4 (master CM 4 and slave CMs 4) in the storage apparatus 1 may perform sharing (synchronization), issuance of a notification and so forth of information relating to control of the storage apparatus 1, access to the plurality of storage devices 51 or the like by performing mutual communication of information thereamong (hereinafter referred to as inter-CM communication). Details of the CMs 4 are hereinafter described.

Each DE 5 includes a plurality of storage devices 51 and performs various kinds of access for writing, reading out and so forth of data or the like into or from a storage device 51 in response to a request from a CE 3 (CM 4). It is to be noted that, while it is depicted in the example of FIG. 1 that four DEs are grouped (collected), the four DEs 5 in one group are coupled in cascade (cascade connection) with each other.

Each storage device 51 is an example of hardware that stores various kinds of data, programs and so forth. As the storage device 51, various storage devices such as, for example, a magnetic disk device such as a hard disk drive (HDD) and a semiconductor drive device such as a solid state drive (SSD) are available.

The relay apparatus 2 is an example of an apparatus coupled with the plurality of CMs 4 and relays information to be transferred between the CMs 4. The relay apparatus 2 exemplarily includes a plurality of (in FIG. 1, two) redundant midplanes (MPs) 20-1 and 20-2, and an MP bridge 21 that couples the MPs 20-1 and 2-2 with each other. It is to be noted that, in the following description, where the MPs 20-1 and 20-2 are not distinguished from each other, each of them is referred to simply as MP 20.

The MP 20 is an example of an apparatus that couples a plurality of CEs 3 (CMs 4) for communication with each other. The MP 20 may exemplarity include a plurality of redundant front end routers (FRTs) 22, and a service controller (SVC) 23.

Each FRT 22 is an example of a coupling unit that couples a plurality of CMs 4 for communication with each other. The FRT 22 may include a plurality of adapters in compliance, for example, with Peripheral Component Interconnect (PCI) Express (PCIe) and coupled with each of the plurality of CMs 4 by a cable or the like in compliance with PCIe.

Each SVC 23 is an example of a monitoring controller or an information processing apparatus (computer) that performs monitoring of the storage apparatus 1. Further, the SVC 23 may perform power supply control to a plurality of CEs 3, for example, on/off control of the power supply, and so forth.

The SVC 23 may include a plurality of interfaces for coupling with the CMs 4 and the SVC 23 may be coupled with a plurality of CMs 4 by a cable or the like through the plurality of interfaces. In the example of FIG. 1, lines indicated by solid lines on the SVC 23 side denoted as "CE #0_CM #0, #1~CE #n−1_CM #0, #1" are connected to lines indicated by solid lines at the CM 4 side denoted as "SVC #0, #1", respectively. By this, the SVC 23 and the plurality of the CMs 4 may be coupled with each other. It is to be noted that the SVC 23 may perform monitoring and power supply control also for other components of the storage apparatus 1.

Further, in the embodiment, each of the plurality of SVCs 23 of the relay apparatus 2 may include a master SVC 23 that performs monitoring, power supply control and so forth of the storage apparatus 1 described above at the initiative thereof. The master SVC 23 may perform communication with the CMs 4 and so forth. If an abnormal state occurs with the master SVC 23, then a different SVC (slave SVC 23) is promoted to the master SVC 23 and may take over the monitoring, power supply control and so forth of the storage apparatus 1 described above.

The MP bridge 21 is an example of a bridge unit that couples the plurality of MPs 20 for communication with each other. Each SVC 23 may monitor a different system (the other MP 20) through the MP bridge 21. It is to be noted that the term "system" here may also be called "series" or "group". Details of the relay apparatus 2 are hereinafter described.

It is to be noted that the storage apparatus 1 includes, for example, a rack (not depicted) in order to incorporate the relay apparatus 2, CEs 3 and DEs 5 described hereinabove, and the relay apparatus 2, a CE 3 and a DE 5 may be removably inserted into the rack.

In the storage apparatus 1 according to the embodiment, since it has the configuration described above, each CM 4 may communicate with a different CM 4 via one of the FRTs 22 in the plurality of MPs 20. In this manner, in the storage apparatus 1, routes for inter-CM 4 communication are made redundant.

Here, in the embodiment, if an SVC 23 (first SVC 23; for example, the master SVC 23) from among the plurality of SVCs 23 redundant between the MPs 20, detects an abnormal part in the relay apparatus 2 in which an abnormal state occurs, then the SVC 23 may notify at least some CM 4 (first CM 4; for example, the master CM 4) from among the CMs 4, of the detected abnormal part. It is to be noted that the term "an abnormal state" may include "a failure state" and "an abnormal part" may include "apart at which a failure occurs".

Further, a CM 4 (for example, the master CM 4) that receives the notification may perform a decoupling process that decouples the abnormal part from the relay apparatus 2 on the basis of the notification from the SVC 23. It is to be noted that the term "decouple" or "a decoupling process" may include "isolate" or "a process for isolation".

In this manner, in the storage apparatus 1, if the SVC 23 detects an abnormal part in the relay apparatus 2, then the CM 4 may perform a decoupling process of the abnormal part detected by the SVC 23. Consequently, a decoupling process of the abnormal part from the CM 4 for which redundant routes to the relay apparatus 2 are secured can be executed. Therefore, the occurrence probability or the like of a secondary failure arising from that the decoupling of the abnormal part is not decoupled can be reduced. Accordingly, the availability of the storage apparatus 1 can be improved.

In the following, details of the storage apparatus 1 are described.

[1-2] Example of Hardware Configuration

Relay Apparatus 2

Figure 2:
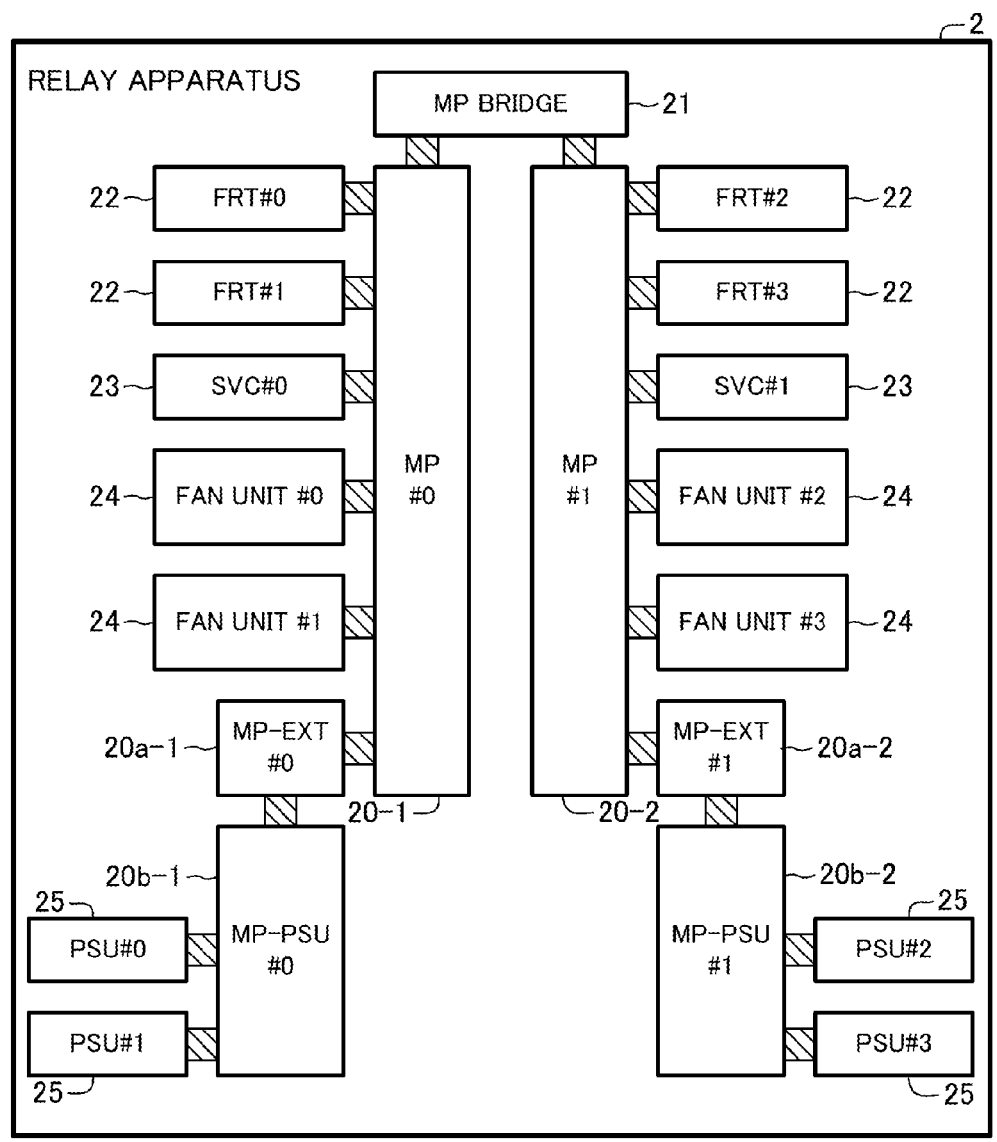
FIG. 2 is a view depicting an example of a configuration of a relay apparatus depicted in FIG. 1.

Now, an example of a hardware configuration of the relay apparatus 2 depicted in FIG. 1 is described with reference to FIGS. 2 and 3. As depicted in FIG. 2, the relay apparatus 2 may include two MPs 20-1 and 20-2 (#0 and #1), MP bridge 21, four FRTs 22 (#0 to #3) and two SVCS 23 (#0 and #1). In addition to the blocks mentioned, the relay apparatus 2 may include two MP-EXTs 20a-1 and 20a-2 (#0 and #1) and two MP-PSUs 20b-1 and 20b-2 (#0 and #1). Furthermore, the relay apparatus 2 may include four fan units 24 (#0 to #3), and four power supply units (PSUs) (#0 to #3).

In the following description, where the units (blocks exemplified in FIG. 2) provided in the relay apparatus 2 are specified, #0 to #3 are sometimes used in place of the reference characters. For example, the MPs 20-1 and 20-2 are sometimes referred to as MP #0 and MP #1, respectively. Further, each of the MP-EXT 20a-1 and 20a-2 is sometimes referred to as merely as MP-EXT 20a, and each of the MP-PSUs 20b-1 and 20b-2 is sometimes referred to merely as MP-PSU 20b.

Further, in the following description, the MP-EXT 20a-1, MP-PSU 20b-1, FRT #0, FRT #1, SVC #0, fan unit #0, fan unit #1, PSU #0 and PSU #1, which are coupled to the MP #0, are sometimes referred to as "#0 system". It is to be noted that the term "system" may also be called "series" or "group". Similarly, the MP-EXT 20a-2, MP-PSU 20b-2, FRT #2, FRT #3, SVC #1, fan unit #2, fan unit #3, PSU #2 and PSU #3, which are coupled with the MP #1, are sometimes referred to as "#1 system". In other words, each of the first (#0) and second (#1) systems including the MP 20, MP-EXT 20a, MP bridge 21, FRTs 22, SVC 23 and fan units 24 is an example of a coupling apparatus that couples a plurality of CMs 4 for communication with each other.

In the example depicted in FIG. 2, a rectangle indicated by slanting lines between different blocks indicates that the blocks are coupled for communication with each other by a connector.

Each MP 20 can be configured, as an apparatus, for example, in the form of a board (board unit). As exemplified in FIG. 2, each of the MPs 20 of the #0 system and the #1 system may couple an MP-EXT 20a, the MP bridge 21, FRTs 22, an SVC 23 and fan units 24 for communication with each other by connectors.

Each MP-EXT 20a is coupled for communication, for example, between an MP 20 and an MP-PSU 20b and may relay a signal or the like to be transferred between the MP 20 and the MP-PSU 20b. The MP-PSU 20b is coupled for communication, for example, between an MP-EXT 20a and PSUs 25. It is to be noted that also each of the MP-EXT 20a and MP-PSU 20b may be configured as an apparatus in the form of a board.

The MP bridge 21 may couple the components of such two systems of the #0 system and the #1 system as described above in the relay apparatus 2 for communication with each other. For example, the MP bridge 21 may include adapters that may be inserted and removed into and from connector of the MP #0 and the connector of the MP #1. The MP bridge 21 may be formed as a unit in which the adapters are connected to the board of the MP bridge 21 by a wiring line, a cable or the like.

The fan units 24 (FANUs) may cool the units of the relay apparatus 2. For example, each of the fan units 24 includes one or more fans and generates an air flow that passes the inside of the relay apparatus 2 and may thereby reduce the heat in the relay apparatus 2.

Each PSU 25 may supply power to the units in the relay apparatus 2. For example, each PSU 25 may supply power to the units 22 to 24 through the MP-PSU 20b, MP-EXT 20a and MP 20.

Each SVC 23 may perform monitoring, control and so forth of the MP 20, MP-EXT 20a, MP-PSU 20b, FRTs 22, fan units 24 and PSUs 25 of the own system. Further, the SVC 23 may perform monitoring, control and so forth of the MP 20, MP-EXT 20a, MP-PSU 20b, FRTs 22, SVC 23, fan units 24 and PSUs 25 of the other system through the MP 20 of the own system and the MP bridge 21. An example of a functional configuration of the SVC 23 is hereinafter described with reference to FIG. 4.

Figure 3:
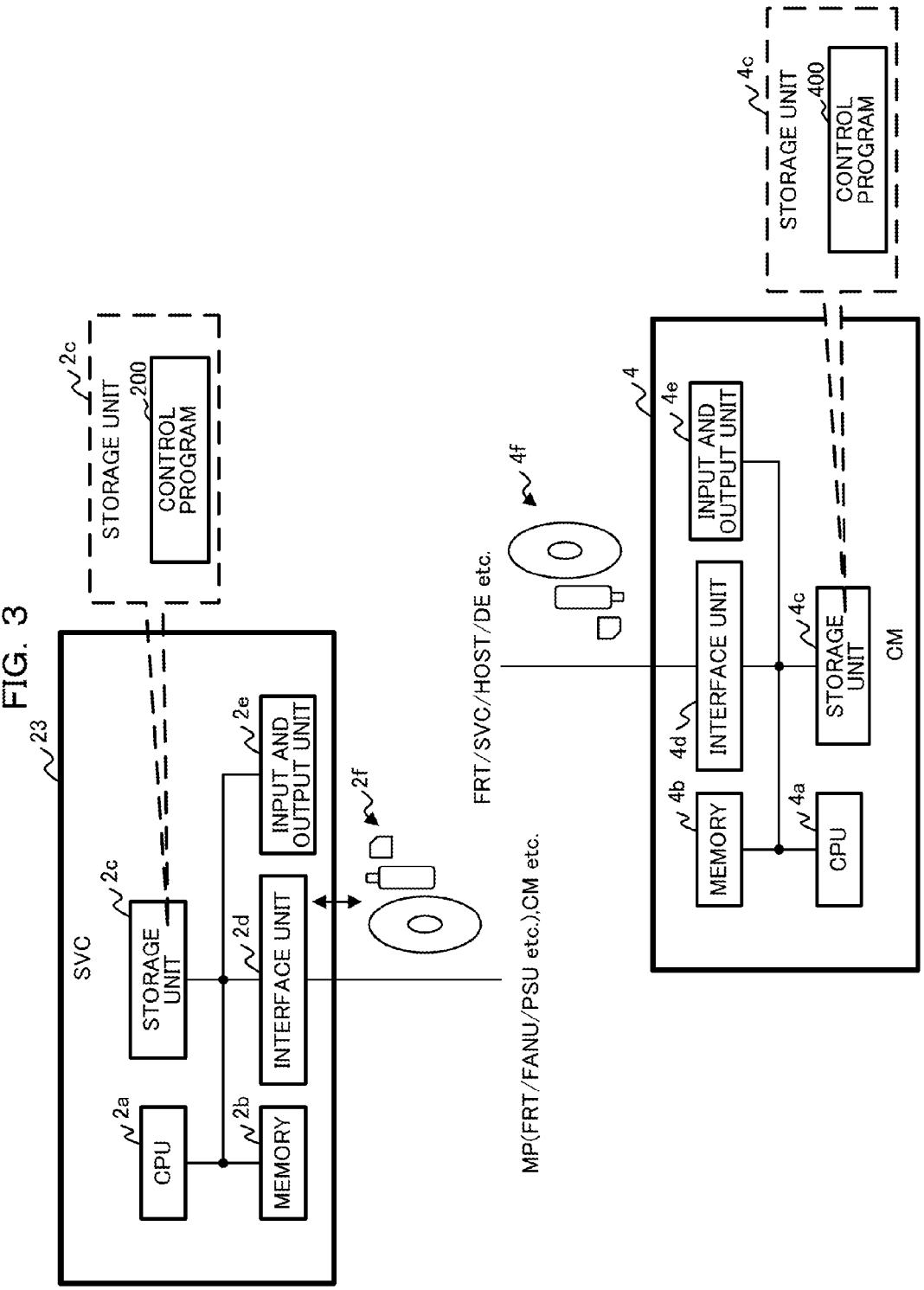
FIG. 3 is a view depicting a hardware configuration of the relay apparatus and a CM depicted in FIG. 1.

Each SVC 23 may have a hardware configuration exemplified in FIG. 3. As depicted in FIG. 3, the SVC 23 may exemplarily include a central processing unit (CPU) 2a, a memory 2b, a storage unit 2c, an interface unit 2d and an input and output unit 2e.

The CPU 2a is an example of an arithmetic processing unit (processor) that performs various kinds of control and arithmetic operation. The CPU 2a may be coupled with the blocks 2b to 2e for communication with each other by a bus. It is to be noted that, as an arithmetic processing unit, in place of the CPU 2a, an electronic circuit, or an integrated circuit (IC) such as, for example, a micro processing unit (MPU), an application specific integrated circuit (ASIC) or a field programmable gate array (FPGA), may be used.

The memory 2b is an example of hardware that stores various data and programs. As the memory 2b, a volatile memory such as, for example, a random access memory (RAM) is available.

The storage unit 2c is an example of hardware that stores various data, programs and so forth. As the storage unit 2c, various storage devices such as a magnetic disk device such as, for example, a HDD, a semiconductor drive device such as a SSD and a nonvolatile memory such as a flash memory or a read only memory (ROM) are available.

For example, the storage unit 2c may store a control program 200 that implements all or part of various functions of the SVC 23. The CPU 2a may implement the functions of the SVC 23 by developing the control program 200 stored, for example, in the storage unit 2c into the memory 2b and executing the control program 200.

The interface unit 2d is an example of a communication interface that performs coupling, control of communication and so forth with the MP 20 (FRTs 22, fan units 24, PSUs 25 and so forth), a CM 4, a working terminal of an operator and so forth. For example, the interface unit 2d may include an adapter for coupling with the MP 20, a plurality of interfaces for coupling with the CMs 4, an adapter (port) for coupling with a working terminal or the like. It is to be noted that the control program 200 may be downloaded from a network not depicted to the SVC 23 through the interface unit 2d.

Further, the SVC 23 may include a reading unit that reads out data or a program recorded in a recording medium 2f. The reading unit may include a coupling terminal or apparatus with or into which the computer-readable recording medium 2f may be coupled or inserted. As the reading unit, for example, an adapter in accordance with Universal Serial Bus (USB), a drive device that accesses a recording disk, a card reader that accesses a flash memory such as an SD card and so forth are available. It is to be noted that the control program 200 may be stored in the recording medium 2f.

As the recording medium 2f and a recording medium 4f hereinafter described, non-transitory recording media such as for example, a flexible disk, optical disks such as a CD, a DVD or a blue ray disk, and flash memories such as a USB memory or an SD card are available. It is to be noted that, as the CD, a CD-ROM, a CD-R, a CD-RW and so forth are available. Meanwhile, as the DVD, a DVD-ROM, a DVD-RAM, a DVD-R, a DVD–RW, a DVD+R, a DVD+RW and so forth are available.

The SVC 23 may include at least one of input units such as a mouse, a keyboard and an operation button, and output units such as a display unit. For example, the output unit may be used for various operations such as registration or change of setting or mode selection (changeover) by an operator (user) or the like or works for inputting of data or the like, and the output unit may be used for confirmation of setting by an operator or the like or various notifications and so forth.

The hardware configuration of the relay apparatus 2 and the SVC 23 described above is exemplary. Accordingly, addition or omission (deletion) of hardware in the relay apparatus 2 and the SVC 23 (for example, addition or deletion of an arbitrary block), disintegration (division) of hardware, integration by an arbitrary combination of hardware, addition or omission (deletion) of a bus or the like may be performed suitably.

Example of Hardware Configuration of CM 4

Now, an example of a hardware configuration of each CM 4 depicted in FIG. 1 is described with reference to FIGS. 1 and 3. As depicted in FIG. 3, the CM 4 may exemplarily include a CPU 4a, a memory 4b, a storage unit 4c, an interface unit 4d and an input and output unit 4e.

The CPU 4a is an example of an arithmetic processing unit (processor) that performs various kinds of control and arithmetic operation. The CPU 4a may be coupled for mutual communication with the blocks in the CM 4 by a bus. It is to be noted that, as the arithmetic processing unit, in place of the CPU 4a, an electric circuit, for example, an IC such as an MPU, an ASIC, an FPGA or the like may be used.

The memory 4b is an example of hardware that stores various data and programs. The memory 4b may be used as a cache memory that temporarily stores data or a program to be used to access a DE 5. As the memory 4b, a volatile memory such as, for example, a RAM is available.

The storage unit 4c is an example of hardware that stores various data, programs and so forth. As the storage unit 4c, various storage devices such as a magnetic disk device such as, for example, an HDD, a semiconductor drive device such as an SSD and a non-volatile memory such as a flash memory or a ROM are available.

For example, the storage unit 4c may store a control program 400 that implements all or part of various functions of the CM 4. The CPU 4a may implement the functions of the CM 4 by developing the control program 400 stored, for example, in the storage unit 4c on the memory 4b and executing the control program 400.

The interface unit 4d is an example of a communication interface that performs coupling, control of communication and so forth with the relay apparatus (FRTs 22 and SVCs 23), the host apparatus, a DE 5, a different CM 4 in the CE 3, a working terminal of an operator and so forth. For example, the interface unit 4d may include an adapter (port) for coupling with the IFs 4d-1 to 4d-3 depicted in FIG. 1, an adaptor (port) for coupling with a working terminal and so forth. It is to be noted that the control program 400 may be downloaded from a network not depicted into the CM 4 through an interface unit 4d.

In the example depicted in FIG. 1, the IF 4d-1 is an example of a communication interface that performs control of coupling and communication and so forth with the relay apparatus 2. As the IF 4d-1, a non-transparent bridge (NTB) that includes an adapter in compliance, for example, with PCIe is available.

The IF 4d-2 is an example of a communication interface (host interface) that performs control of coupling and communication and so forth with the host apparatus. As the IF 4d-2, a channel adapter (CA) that includes an adapter in compliance with, for example, Local Area Network (LAN), Storage Area Network (SAN), Fibre Channel (FC) or Infini-Band is available. The IF 4d-2 may be coupled with the host apparatus by a cable or the like in compliance with any of the standards mentioned or may be coupled through a network not depicted. It is to be noted that, in the example of FIG. 1, four such IFs 4d-2 are provided in the CM 4.

The IF 4d-3 is an example of a communication interface that performs control of coupling and communication and so forth with a DE 5 (storage device 51). The IF 4d-3 may include, for example, a plurality of (two in FIG. 1) input/output (I/O) controllers (IOCs) 4g, and an expander (EXP) 4h.

Each IOC 4g is an example of an I/O controller that controls access (I/O) to the DE 5. Meanwhile, the EXP 4h is an example of a module for performing expansion of the number of devices that may be coupled (for example, by SAS coupling) under the CM 4. The EXP 4h may be coupled with DEs 5 by buses compatible with SAS.

It is to be noted that, in the example of FIG. 1, the plurality of IOCs 4g are coupled with the EXP 4h of the own CM 4 and the EXP 4h of the other CM 4 in the CE 3, and the EXPs 4h are coupled with the DEs 5 individually corresponding to the CE 3.

For example, an access request to a DE 5 (storage device 51) inputted from the host apparatus through an IF 4d-2 is used to generate a packet by the CPU 4a and an IOC 4g and the generated packet is issued to the DE 5 through the EXP 4h. On the other hand, a response from the DE 5 is received by the CPU 4a through the EXP 4h and the IOC 4g and is returned to the host apparatus through the IF 4d-2.

Referring back to FIG. 3, the interface unit 4d may include a reading unit that reads out data or a program recorded in the recording medium 4f. The reading unit may include a coupling terminal or apparatus with or into which the computer-readable recording medium 4f may be coupled or inserted. As the reading unit, an adapter in compliance, for example, with USB, a drive device that accesses a recording disk, a card reader that accesses a flash memory such as an SD card and so forth are available. It is to be noted that the control program 400 may be stored in the recording medium 4f.

The input and output unit 4e may include at least one of input units such as a mouse, a keyboard and an operation button, and output units such as a display unit. For example, the input unit may be used for various operations such as registration or change of setting or mode selection (change-over) of the storage apparatus system by an operator (user) or the like or works for inputting of data or the like. The output unit may be used for confirmation of setting by an operator or the like or for outputting of various notifications and so forth.

The hardware configuration of the CM 4 described is exemplary. Accordingly, addition or omission (deletion) of hardware in the CM 4 (for example, addition or deletion of an arbitrary block), disintegration (division) of hardware, integration of hardware by an arbitrary combination of hardware, addition or omission (deletion) of a bus or the like may be performed suitably.

[1-3] Example of Functional Configuration

SVC 23

Figure 4:
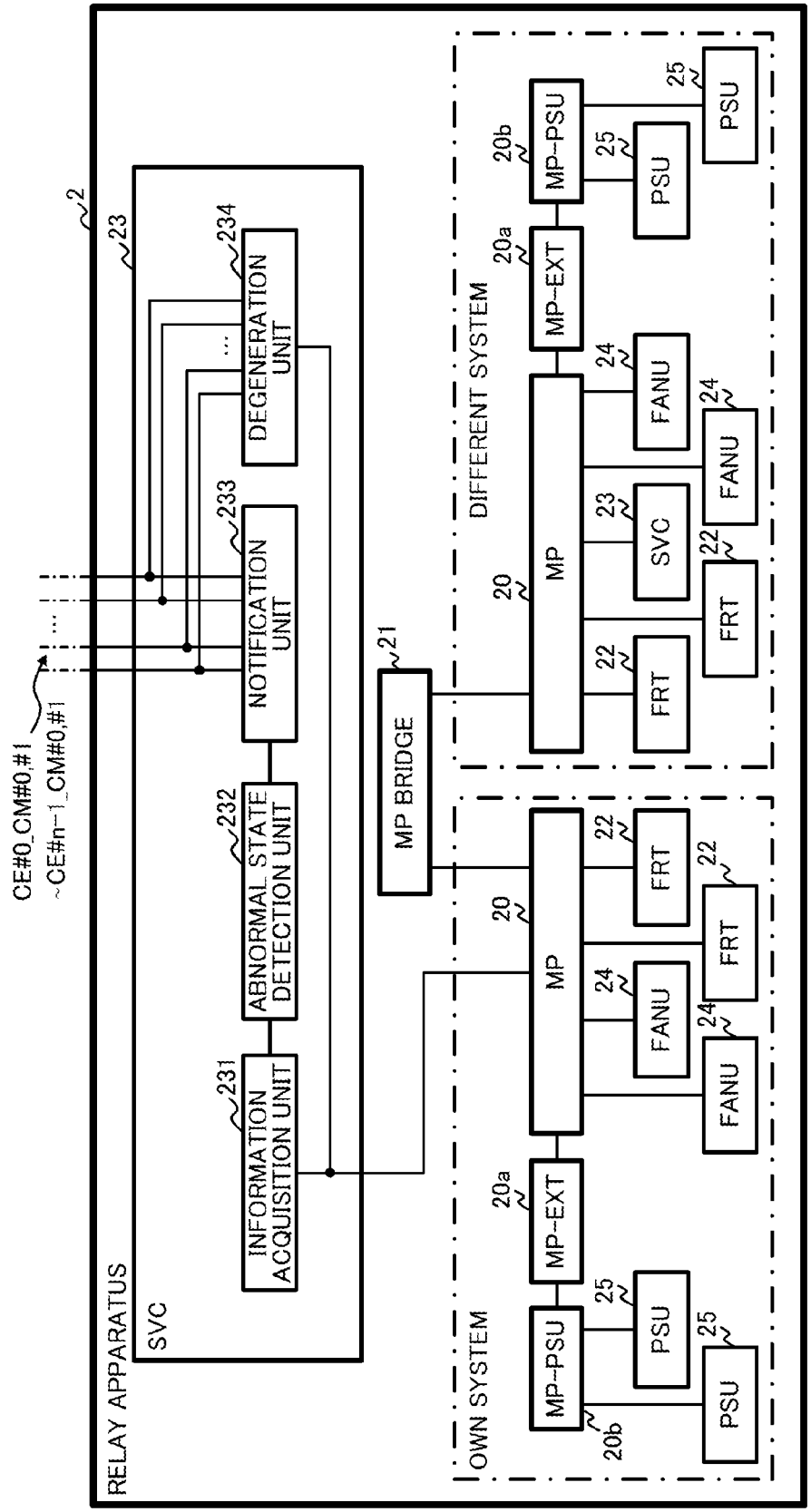
FIG. 4 is a view depicting an example of a functional configuration relating to a monitoring process of an SVC depicted in FIGS. 1 and 2.

Now, an example of a functional configuration of each SVC 23 according to the embodiment is described with reference to FIG. 4. FIG. 4 is a view depicting the relay apparatus 2 depicted in FIG. 2 focusing on the SVC 23 and depicting an example of a functional configuration relating to a monitoring process of the SVC 23.

As depicted in FIG. 4, the SVC 23 may exemplarily include an information acquisition unit 231, an abnormal state detection unit 232, a notification unit 233 and a degeneration unit 234. The functions of the components of the SVC 23 may be realized by executing the control program 200 by the CPU 2a.

The information acquisition unit 231 may acquire monitoring information to be used for decision of an abnormal state of the parts in the relay apparatus 2. For example, the information acquisition unit 231 may acquire monitoring information of the MP 20, MP-EXT 20a, MP-PSU 20b, FRTs 22, SVC 23, fan units 24 and PSUs 25 of the own system and the MP bridge 21 through the connectors to the MP 20. Further, the information acquisition unit 231 may acquire monitoring information of the MP 20, MP-EXT 20a, MP-PSU 20b, FRTs 22, SVC 23, fan units 24 and PSUs 25 of the other system through the MP 20 of the own system and the MP bridge 21.

As a technique for acquiring monitoring information (monitoring technique) by the information acquisition unit 231, techniques exemplified below are available. It is to be noted that, in the description given below, where the MPs 20, MP-EXTs 20a, MP-PSUs 20b, MP bridge 21, FRTs 22, SVCs 23, fan units 24 and PSUs 25 provided in the individual systems (coupling apparatus) in the relay apparatus 2 are not distinguished from each other, they are sometimes represented each as "a unit" as an example of a module into and from which they may be inserted and removed to the coupling apparatus.

(i) Heartbeat Monitoring to Different System SVC 23

Each SVC 23 in the relay apparatus 2 may periodically transmit a signal (heartbeat) to the SVC 23 and a CM 4 (for example, to the master CM 4 or all CMs 4) of the different system. The information acquisition unit 231 may acquire a reception result (reception situation) of the heartbeat destined for the SVC 23 of the own system and received from the SVC 23 of the different system as monitoring information of the different system SVC 23.

(ii) Input Power Supply Monitoring

The information acquisition unit 231 may monitor the power supply inputted to the individual units. In this monitoring, the information acquisition unit 231 may monitor occurrence of power outage of the entire MP 20 of the different system, occurrence of partial power outage of a power supply route from the PSU 25 to a different unit in the system to which the PSU 25 belongs and so forth. For example, the information acquisition unit 231 may acquire a direct current (DC) voltage inputted to the MP 20 or each unit or the like as monitoring information.

(iii) State Monitoring

In the relay apparatus 2, the master SVC 23 is sometimes notified of a status of each unit from the unit (or the MP 20, MP-EXT 20a, MP-PSU 20b or the like with which the unit is coupled). This status may include, for example, a mounting state indicating that the unit is in a state coupled with the MP 20, MP-EXT 20a, MP-PSU 20b or the like, a dismounting state indicating that the unit is removed or the like.

The information acquisition unit 231 may acquire such a state as described above received from hardware of a unit of the different system (or the own system) as monitoring information.

It is to be noted that the information acquisition unit 231 may acquire, in addition to or instead of such states as described above, a state defined in advance in the relay apparatus 2, a measurement value by which a range of a normal state or an abnormal state or the like is defined as monitoring information. As the measurement value, the rotational speed of a fan in the fan units 24, the temperature of the units and so forth are available.

The information acquisition unit 231 acquires monitoring information regarding at least one of (i) to (iii) described above and may output (issue a notification of) the acquired monitoring information to the abnormal state detection unit 232.

The abnormal state detection unit 232 decides on the basis of the monitoring information acquired by the information acquisition unit 231 whether or not the monitoring information indicates an abnormal state (for example, a failure state) of at least one of a unit in the relay apparatus 2 and may output (issue a notification of) information relating to the abnormal state in the monitoring information decided as indicating an abnormal state to the notification unit 233.

For example, the abnormal state detection unit 232 may detect an abnormal state on the basis of a monitoring result of any of (i) to (iii) described hereinabove or may detect an abnormal state on the basis of a predetermined combination of the monitoring results of (i) to (iii). It is to be noted that, depending upon the type of the occurring abnormal state, an abnormal state is sometimes detected stepwise or at similar timings from a plurality of monitoring results regarding (i) to (iii) described above.

The information relating to an abnormal state may include a type of monitoring information decided to indicate an abnormal state (type of an abnormal state), for example, power outage, an abnormal heartbeat or unmounting, and may include an abnormal part at which the abnormal state occurs, for example, information indicating a unit such as the FRT 22 or the SVC 23. The abnormal state detection unit 232 may generate and output such information relating to an abnormal state for each type of each detected abnormal state to the notification unit 233.

Such abnormal states as exemplified below are available as an abnormal state that may occur in the relay apparatus 2. It is to be noted that, where an example in which an abnormal state occurs in any of the systems is described in the following description, the system in which the abnormal state occurs is assumed as the #1 system, and the system in which the abnormal state does not occur is assumed as the #0 system.

(I) Power Outage to One System (#1 System) in Relay Apparatus 2

In this case, in the SVC 23 (information acquisition unit 231) of the #0 system, monitoring information indicative of entire or partial outage of the #1 system can be acquired through input power supply monitoring. Accordingly, the abnormal state detection unit 232 may detect entire or partial power outage of the #1 system on the basis of the monitoring information relating to the input power supply monitoring.

On the other hand, if entire power outage to the #1 system or partial outage to the #1 system including the SVC 23, a heartbeat from the SVC 23 of the #storage apparatus 1 that suffers from the power outage is not received by the SVC 23 of the #0 system. Accordingly, in this case, the abnormal state detection unit 232 of the #0 system decides on the basis of the monitoring information relating to the heartbeat monitoring that a heartbeat is not received for a fixed period of time from the SVC 23 and may detect an abnormal state of the heartbeat of the SVC 23 of the #1 system.

It is to be noted that, in regard to the units of the #1 system whose operation is stopped by the power outage, a notification of the status indicative of unmounting is sometimes issued to the SVC 23 of the #0 system. In this case, the abnormal state detection unit 232 may detect the unmounting of one or more units on the basis of the monitoring information relating to the state monitoring.

(II) Hang-Up of SVC 23 of #1 System

In this case, the SVC 23 of the #0 system does not receive a heartbeat from the SVC 23 of the #1 system that has hung up. Accordingly, the abnormal state detection unit 232 of the #0 system decides that a heartbeat is not received for a fixed period of time from the SVC 23 on the basis of the monitoring information relating to the heartbeat monitoring, and may detect a heartbeat abnormal state of the SVC 23 of the #1 system.

(III) Abnormal State of SVC 23 of #1 System

Abnormal states of the SVC 23 of the #1 system include also an abnormal state other than the (I) or (II) described above. For example, it is an example that the SVC 23 of the #1 system detects an abnormal state of the own system and issues a notification of the abnormal state to the SVC 23 of the #0 system, or that the status, a measurement value or the like of the SVC 23 of the #1 system exhibits an abnormal state or an abnormal value (higher or lower than a predetermined threshold value).

In such a case, the SVC 23 of the #0 system may detect an abnormal state of the SVC 23 of the #1 system on the basis of the monitoring information.

(IV) Abnormal State of Unit of #1 System Other than SVC 23 of #1 System As an abnormal state of a unit of the #1 system other than the SVC 23 of the #1 system, for example, a case in which the status, a measurement value or the like of a unit indicates an abnormal state or an abnormal value (for example, higher or lower than a predetermined threshold value) is available. As an example, a case in which the status of a unit indicates an abnormal state (for example, unmounting) or another case in which a measurement value or the like of the rotational speed of a fan in a fan unit 24, the temperature of each unit or the like indicates an abnormal value is available.

In such a case, the SVC 23 of the #0 system may detect an abnormal state of the unit of the #1 system on the basis of the monitoring information. It is to be noted that, at this time, a similar abnormal state may be detected also by the SVC 23 of the #1 system.

It is to be noted that the abnormal stats of (I) to (III) described above may be detected by any of the master SVC 23 and the slave SVC 23.

(V) Abnormal State of MP Bridge 21

In the storage apparatus 1 according to the embodiment, the units in the relay apparatus 2 are made redundant in the two systems as exemplified in FIGS. 1 and 2. However, the units of the two systems are coupled with each other by the MP bridge 21.

Since the MP bridge 21 is not made redundant, if an abnormal state such as a failure occurs with the MP bridge 21, then the access bus for inter-system communication in the relay apparatus 2 is cut off. Therefore, the master SVC 23 (for example, the SVC #0) and the slave SVC 23 (for example, the SVC #1) does not confirm the state of the opposing parties between them.

Figure 5:
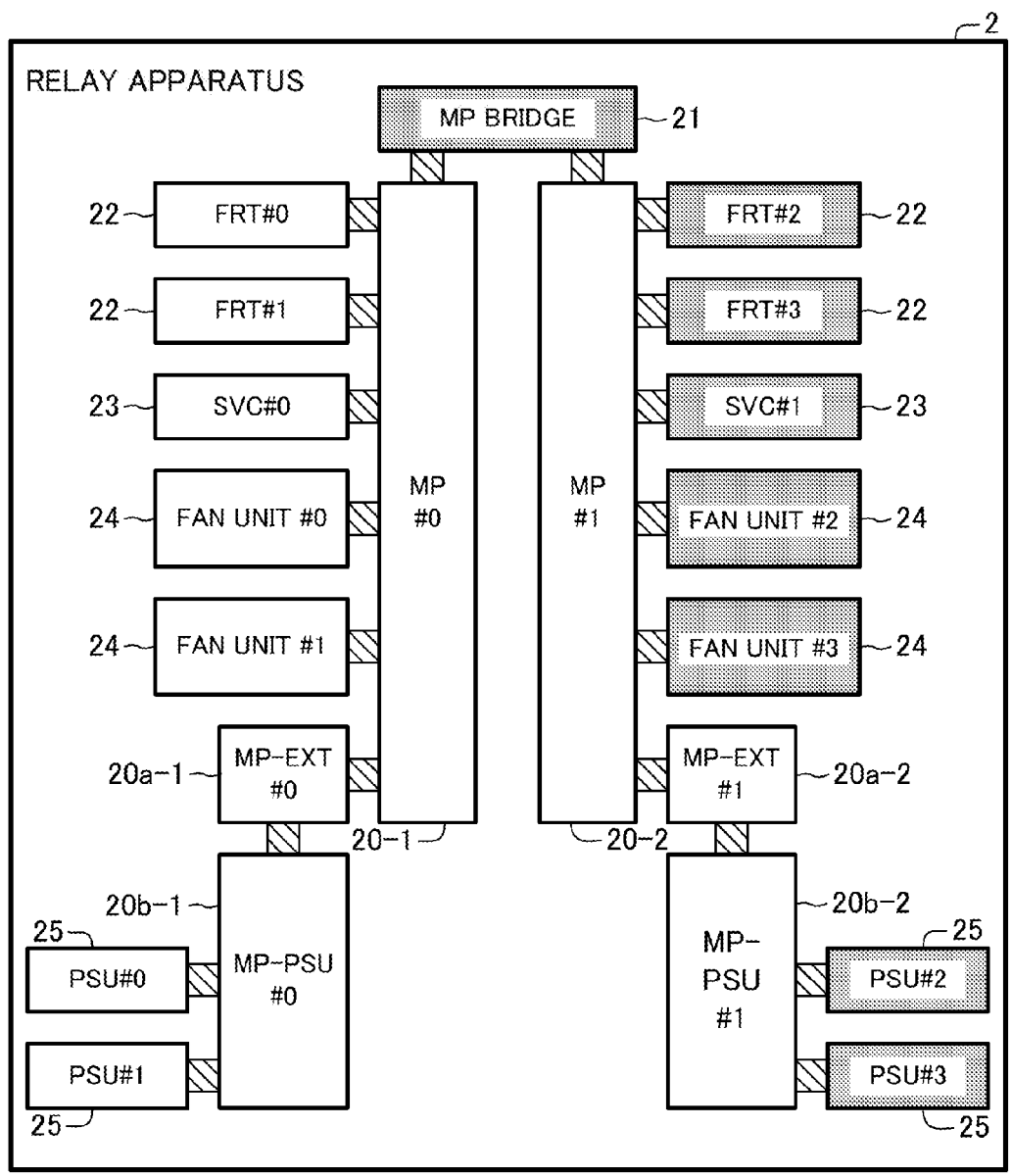
FIG. 5 is a view exemplifying an influence range on monitoring control when an abnormal state occurs in an MP bridge.

As an example, if an abnormal state occurs with the MP bridge 21 as depicted in FIG. 5, then the master SVC #0 is not able to access any of the FRT #2, FRT #3, SVC #1, fan unit #2, fan unit #3, PSU #2 and PSU #3 indicated by hatchings. Therefore, the monitoring of the blocks mentioned may possibly be disabled.

Where an abnormal state occurs with the MP bridge 21 in this manner, the abnormal state detection unit 232 may detect unmounting of the MP bridge 21 and may detect unmounting also of all units of the other system connected across the MP bridge 21.

It is to be noted, however, that, even if unmounting of all units of the other system is detected by the abnormal state detection unit 232, the possibility that the unmounting of the units may arise from an abnormal state of the MP bridge 21 is high, and actually the possibility that all units of the other system may be normal is high.

Therefore, if unmounting of the MP bridge 21 and all units of the other system is detected, then the abnormal state detection unit 232 may output, on the basis of the monitoring information relating to a state (unmount) of the MP bridge 21, information relating an abnormal state including information representative of the MP bridge 21 as an abnormal part to the notification unit 233. Meanwhile, as regards a unit (subordinate part) of the different system, the abnormal state detection unit 232 may suppress information relating to an abnormal state including information representative of the unit of the different system as an abnormal part from being outputted (being issued as a notification) from the abnormal state detection unit 232 to the CM 4.

In order to prevent a notification that a unit of the different system is an abnormal part from being issued to a CM 4, for example, it is advisable to prevent a notification of information representing the unit of the different system as an abnormal part from being issued from the abnormal state detection unit 232 to the notification unit 233. Or, although a notification of information representing that the unit of the different system is an abnormal part is issued from the abnormal state detection unit 232 to the notification unit 233, such an instruction as to suppress transmission of the notification from the notification unit 233 to the CM 4 may be provided.

It is to be noted that, if the abnormal state detection unit 232 detects, after it outputs information relating to an abnormal state to the notification unit 233, that the corresponding abnormal part is recovered by active exchange or the like, then also it is possible for the abnormal state detection unit 232 to output information indicating that the abnormal part is recovered to the notification unit 233. It is to be noted that recovery of the abnormal part may be detected from the fact that, for example, in the state monitoring, a change from an unmounting state to a mounting state has occurred (that a different system unit that has been decoupled is recognized).

The notification unit 233 may notify a plurality of CMs 4 of information from the abnormal state detection unit 232. This information may include information representative of an abnormal part for each of types of abnormal states detected by the abnormal state detection unit 232 as described hereinabove. The notification destination by the notification unit 233 may be at least the master CM 4 from among the CMs 4 provided in each of the plurality of CEs 3 and, for example, may be all CMs 4 in the storage apparatus 1.

It is to be noted that, since, between the SVCs 23, the master SVC 23 may issue a notification to the CMs 4 (the master SVC 23 has the authority to perform notification) as described hereinabove, also notification of an abnormal part may be performed by the master SVC 23. Meanwhile, if the slave SVC 23 detects an abnormal state of the master SVC 23, then the slave SVC 23 itself is promoted to the master SVC 23 and may perform notification of an abnormal part to the CMs 4.

Therefore, if the abnormal state detection unit 232 detects an abnormal state of a different system SVC 23, then the notification unit 233 determines whether or not the own SVC 23 is a slave unit. Then, if the notification unit 233 is a slave unit, then the notification unit 233 may issue a notification of information from the abnormal state detection unit 232 to a plurality of CMs 4 after it is promoted to a master unit (after it acquires the authority to issue a notification to a plurality of CMs 4). By the configuration, even if an abnormal state occurs with the master SVC 23, the CM 4 can recognize the abnormal state with certainty.

It is to be noted that the promotion of the slave SVC 23 to the master SVC 23 may be performed, for example, by updating setting information and so forth stored in the storage device such as the memory 2b in the SVC 23 from an indication of the slave unit to an indication of the master unit.

Further, if the notification unit 233 receives, from the abnormal state detection unit 232, information representing that the type of the abnormal state is a status abnormal state (unmounting) and the abnormal part is the MP bridge 21, then the notification unit 233 may issue a notification of the information to the plurality of CMs 4. At this time, the notification unit 233 may suppress notification of unmounting of the parts (subordinate FRT 22, fan units 24, PSU 25 and so forth including the slave SVC 23) of the different system, whose recognition is disabled by the unmounting. In this manner, if unmounting of the MP bridge 21 is detected by the abnormal state detection unit 232, then the notification unit 233 may notify the CMs 4 of the abnormal state of the MP bridge 21 from among all of the detected abnormal states.

It is to be noted that, if the notification unit 233 receives an input of information indicating that the abnormal part is recovered from the abnormal state detection unit 232, then the notification unit 233 may notify the plurality of CMs 4 (at least the master CM 4) of the information.

The degeneration unit 234 may perform, in a degeneration process by a CM 4 hereinafter described, degeneration of a unit of the own system or the different system in accordance with an instruction from the master CM 4.

For example, if the degeneration unit 234 receives an instruction to degenerate a unit of the own system or the different system, then the degeneration unit 234 may disable or reset the unit and control the power supply to the unit to an off state to stop the unit. Such degeneration of a unit may be performed by various known techniques, and detailed description of a procedure and so forth of detailed degeneration for individual units is omitted herein.

Further, when degeneration designated by the master CM 4 is completed, the degeneration unit 234 may transmit a completion notification to the CM 4.

CM 4

Figure 6:
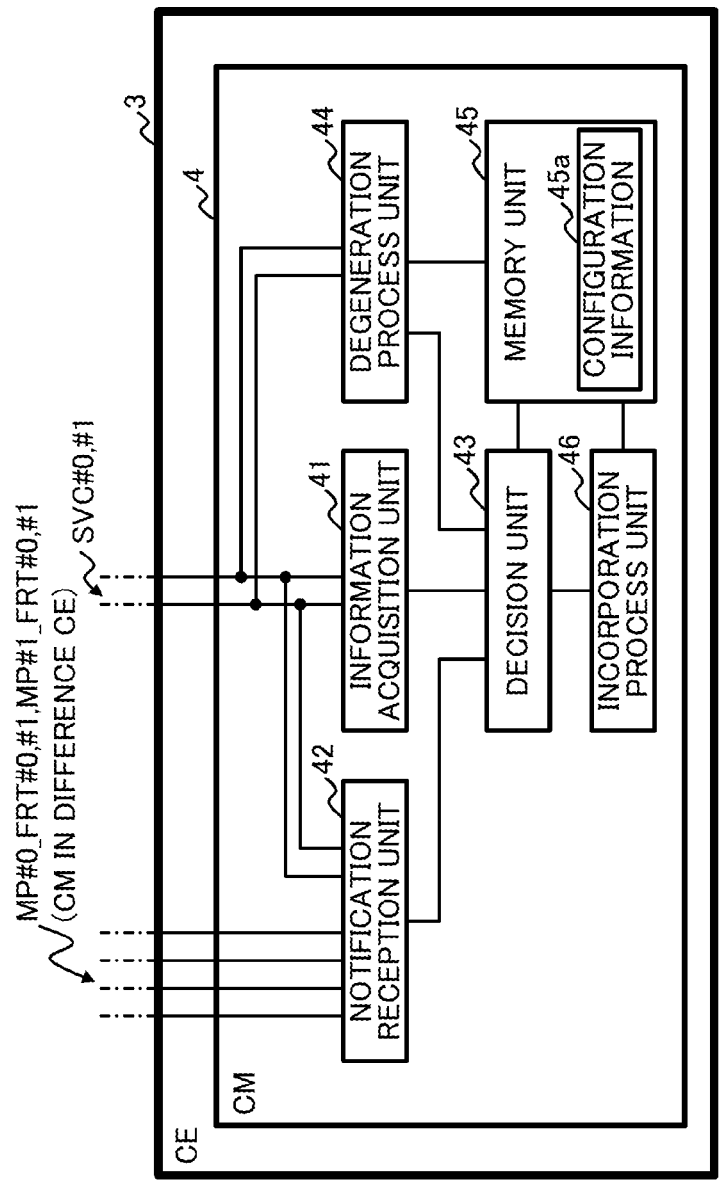
FIG. 6 is a view depicting an example of a functional configuration relating to a degeneration process of the CM depicted in FIG. 1.

Now, an example of a functional configuration of each CM 4 according to the embodiment is described. FIG. 6 is a view depicting a functional configuration of the CMs 4 depicted in FIG. 1 relating to the degeneration process.

As depicted in FIG. 6, each CM 4 may exemplarily include an information acquisition unit 41, a notification reception unit 42, a decision unit 43, a degeneration process unit 44, a memory unit 45 and an incorporation process unit 46. The functions of the units may be realized by executing a control program 400 by the CPU 4a. It is to be noted that, although it is assumed in the following description that the CM 4 depicted in FIG. 6 is the master CM 4, since a slave CM 4 may be promoted to the master CM 4 originating from an abnormal state of the current master CM 4, all of the CMs 4 in the storage apparatus 1 may have the configuration depicted in FIG. 6.

The information acquisition unit 41 may acquire monitoring information to be used for decision of an abnormal state of apart in the relay apparatus 2 and output (issue a notification of) the acquired monitoring information to the decision unit 43. For example, the information acquisition unit 41 may acquire monitoring information of all SVCs 23 of the #0 system and the #1 system through the lines coupled to the SVCs #0 and #1.

As a technique for acquisition of monitoring information (technique for monitoring) by the information acquisition unit 41, heartbeat monitoring by the information acquisition unit 231 of the SVC 23 described hereinabove (refer to (i) above) is available. For example, the information acquisition unit 41 may acquire reception results (reception situations) of the heartbeat destined for the CM 4 received from the SVCs #0 and #1 (all SVCs 23) as monitoring information of the SVC 23.

The notification reception unit 42 is an example of a reception unit that receives information relating to an abnormal state, information representing that the abnormal part is recovered and so forth transmitted from the abnormal state detection unit 232 of the SVC 23 and outputs (issues a notification of) the received information to the decision unit 43.

It is to be noted that, in the embodiment, a notification from the notification unit 233 may be transmitted to all CMs 4 in the storage apparatus 1. In this case, each CM 4 receiving the notification from the notification unit 233 may transfer the notification to the master CM 4. This can prevent such a situation that the master CM 4 does not acquire a notification from the notification unit 233 by an error or the like. It is to be noted that notification from each CM 4 to the master CM 4 may be performed via the IF 4*d*-1 and the FRT 22 of the relay apparatus 2 exemplified in FIG. 1.

The decision unit 43 may decide a target for which a degeneration process by the degeneration unit 234 is to be performed (for example, an abnormal part) on the basis of information inputted from the information acquisition unit 41 and the notification reception unit 42.

For example, the decision unit 43 may receive information relating to an abnormal state on the basis of (I) to (V) described hereinabove outputted from the notification reception unit 42 and decide an abnormal part included in the information as a target of the degeneration process.

Further, in the embodiment, since heartbeat monitoring is performed by the information acquisition unit 41, for an abnormal state of a unit including the SVC 23, for example, in (I) to (III) described hereinabove, the decision unit 43 may perform a decision on the basis of information inputted from the information acquisition unit 41 (monitoring information).

It is to be noted that the decision unit 43 may decide a target of the degeneration process, for example, on the basis of the information inputted to the decision unit 43 earlier from between the information inputted from the information acquisition unit 41 and the information received from the notification reception unit 42.

It is to be noted that, if the decision unit 43 receives information relating to an abnormal state of a plurality of units, then the decision unit 43 may comprehensively judge the units to determine that this represents an abnormal state of a unit, which can have an influence on a plurality of units such as, for example, the MP 20, MP-EXT 20*a* or MP-PSU 20*b* and so forth. In this case, the decision unit 43 may refer to configuration information 25*a* hereinafter described stored in the memory unit 45.

Incidentally, if an abnormal state such as a failure occurs with the MP bridge 21 as described hereinabove, then the access bus for inter-system communication in the relay apparatus 2 is cut off and the master SVC 23 and the slave SVC 23 does not mutually confirm the status of the other party. At this time, also the slave SVC 23 (for example, the SVC #1) whose communication with the master SVC 23 (for example, the SVC #0) is disabled may detect unmounting of the MP bridge 21 and all units of the #0 system.

In this instance, the slave SVC #1 is promoted to the master SVC #1 in order to notify the CMs 4 of information relating to the abnormal state (abnormal state of the MP bridge 21). However, in the case where also the master SVC #0 is operating normally, overlapping of the master SVCs 23 occurs although only one master SVC 23 is supposed to be present in the relay apparatus 2, and there is the possibility that some hindrance may occur in monitoring of the relay apparatus 2 or in control of the CEs 3 (CMs 4).

Therefore, when the decision unit 43 notifies the degeneration process unit 44 that the MP bridge 21 is a target of the degeneration process, the decision unit 43 may issue an instruction to perform a degeneration process of the units under the slave SVC 23 (all units in the system of the slave SVC 23). It is to be noted that the slave SVC 23 has been promoted to the master SVC 23 already at this point of time and both of the SVC #0 and the SVC #1 act as the master SVC 23. However, for the convenience of description, the slave SVC 23 (for example, SVC #1) here is represented as slave SVC 23.

It is to be noted that, where the MP bridge 21 is abnormal, there is the possibility that a notification of an unmounting state of the MP bridge 21 may be issued from both of the SVCs 23 of the two systems to the CM 4. In this case, the decision unit 43 may refer to the setting information of the storage apparatus system and so forth to discriminate the SVC 23 that has been the slave SVC 23 before the notification of the abnormal state of the MP bridge 21. Or, the SVC 23 from which reception of the unmounting notification of the MP bridge 21 is later may be discriminated as the slave SVC 23. This is because, since the slave SVC 23 executes a process for promoting itself to the master SVC 23, the timing at which it transmits the unmounting notification is supposed to be later.

Also there is a case in which the slave SVC 23 becomes abnormal before or after an abnormal state occurs with the MP bridge 21. In this case, even if a failure occurs with a unit under the slave SVC 23, since the access bus from the master SVC 23 to the units under the SVC 23 is cut, it is difficult to detect or cope with the failure. Further, since also the slave SVC 23 is abnormal, also it is difficult to degenerate units under the slave SVC 23 and the master SVC 23, in each of which an abnormal state has occurred, from the master CM 4.

In this manner, when both of the MP bridge 21 and the slave SVC 23 become abnormal, there is the possibility that it is not able to cope with a significant failure in the relay apparatus 2.

Therefore, when both of the MP bridge 21 and the slave SVC 23 are abnormal, the decision unit 43 may instruct the degeneration process unit 44 to stop the entire storage apparatus system (storage apparatus 1).

It is to be noted that, when both of the MP bridge 21 and the slave SVC 23 are abnormal, the notification reception unit 42 may possibly receive information relating to an abnormal state of the MP bridge 21 and the slave SVC 23 from the master SVC 23. Further, at this time, the information acquisition unit 41 may detect monitoring information relating to a heartbeat abnormal state of the slave SVC 23. The decision unit 43 may decide on the base of the information from the information acquisition unit 41 and the notification reception unit 42 that both of the MP bridge 21 and the slave SVC 23 are abnormal.

Further, if information representing that the abnormal part has been recovered (a notification that a unit has been mounted) is received from the notification reception unit 42, then the decision unit 43 may instruct the incorporation process unit 46 to perform a re-incorporation process of the pertaining unit into the storage apparatus system. Details of the incorporation process unit 46 and the re-incorporation process are hereinafter described.

The memory unit 45 is a storage area for storing data and may be implemented by at least part of the storage area of the memory 4*b* or the like. As exemplified in FIG. 6, configuration information 45*a* may be stored in the memory unit 45. The configuration information 45*a* is an example of information that is managed by the CM 4 and represents a status of the storage apparatus 1.

An example of the configuration information 45*a* is depicted in FIG. 7. As depicted in FIG. 7, the configuration information 45*a* may include information of the units, for example, a unit name, a status of the unit (for example, online/offline) and so forth. It is to be noted that, although the example of FIG. 7 depicts the status of the units of the relay apparatus 2 for the convenience of description, the configuration information 45*a* may have and manage the status of other units of the storage apparatus 1, for example, the status of parts in the CEs 3 or the DEs 5.

The configuration information 45*a* may be used to present the status of the storage apparatus 1, for example, for an output device (input and output unit 4*e*) of the CM 4, the host apparatus, a work terminal or the like. For example, a manager or the like of the storage apparatus 1 may perform exchange or the like of an abnormal part on the basis of the presented information.

The degeneration process unit 44 may perform a degeneration process (decoupling process) for a unit of a target of the degeneration process designated from the decision unit 43.

In other words, the degeneration process unit 44 is an example of a decoupling processor that performs a decoupling process for decoupling an abnormal part from the relay apparatus 2 on the basis of information relating to an abnormal state received by the notification reception unit 42 or the like.

The degeneration process may include a process of transmitting, to the master SVC 23 or an SVC 23 (for example, the slave SVC 23) of the system (MP 20) including an abnormal part, an instruction to stop operation of the abnormal part. Further, the degeneration process may include a process of setting the status of a unit corresponding to an abnormal state in the configuration information 45*a* so as to be invalid.

As a degeneration process by the degeneration process unit 44, such processes as exemplified below are available in response to a target of the degeneration process. It is to be noted that, where an example in which an abnormal state occurs with the #0 system or the #1 system is described, the system in which the abnormal state occurs is assumed to be the #1 system, and the system in which the abnormal state does not occur is assumed to be the #0 system.

(a) Abnormal State of Individual Units of #1 System

In this case, the degeneration process unit 44 may instruct the master SVC #0 to stop the unit of the degeneration target. Further, if the degeneration process unit 44 receives a notification of completion of stopping (degeneration) from the master SVC #0, then it may update the configuration information 45*a* so as to invalidate the status of the unit of the degeneration target.

It is to be noted that, in the updating of the configuration information 45*a*, the degeneration process unit 44 may invalidate the unit of the degeneration target, for example, by setting the status of the entry of "SVC #1" to a value that signifies invalidity such as "offline".

Consequently, also an abnormal part that is not able to be accessed from the master SVC 23 due to an abnormal state of the MP bridge 21 and is not able to be decoupled can be decoupled from the storage apparatus system (storage apparatus 1) by the master CM 4 using a redundant route.

(b) Abnormal State of MP Bridge 21

If the MP bridge 21 becomes abnormal, then the degeneration process unit 44 is instructed from the decision unit 43 to perform a degeneration process of units under the SVC #1 including the slave SVC 23 (for example, the SVC #1).

In this case, the degeneration process unit 44 may perform a degeneration process for degenerating a plurality of units including the SVC #1 provided in the #1 system (second coupling apparatus) (decoupling process for decoupling the plurality of units from the relay apparatus 2). For example, the degeneration process unit 44 may instruct the slave SVC #1 to degenerate the FRT #2 and the FRT #3 that perform interconnect of the CMs 4. The degeneration is completed, then the degeneration process unit 44 subsequently instruct the slave SVC #1 to degenerate the slave SVC #1 itself. Since the SVC 23 of the system to be degenerated degenerates the other units than the SVC 23 itself and finally places the SVC 23 itself into a stopping state, the units under the SVC #1 can be degenerated with certainty.

At this time, preferably the fan units 24 (#2 and #3) and the PSUs 25 (#2 and #3) do not undergo actual degeneration such as turning off of the power supply but also the fans of the fan units 24 continues to rotate. This is because, since the #0 system continues to operate, if the fans of the #1 system are stopped, then the temperature in the relay apparatus 2 rises and there is the possibility that this may give rise to a hindrance to the operation of the #0 system. Accordingly, the degeneration process unit 44 may inhibit to issue an instruction to degenerate the fan units 24 and the PSUs 25 of the #1 system to the slave SVC #1.

Further, if the degeneration process unit 44 issues a degeneration instruction to the slave SVC 23 (or if a notification of completion of degeneration is received from the master SVC #0), then the degeneration process unit 44 may update the configuration information 45*a* so as to invalidate the degeneration target. For example, the degeneration process unit 44 may update the configuration information 45*a* so as to invalidate "FANU #2", "FANU #3", "PSU #2" AND "PSU #3" corresponding to the fan units 24 and the PSUs 25 that are not stopped in addition to "FRT #2", "FRT #3" and "SVC #1" corresponding to the FRT 22 and the SVC 23 that have been stopped. By such updating, in regard not only to the FRTs 22 and the SVCs 23 of the #1 system but also to the fan units 24 and the PSUs 25 of the #1 system, the part status on the system management can be handled such that they have been decoupled from the storage apparatus system already. It is to be noted that, at this time, the degeneration process unit 44 may be invalidated in regard to the MP bridge 21.

(c) Abnormal State of MP bridge 21 and Slave SVC #1

If both of the MP bridge 21 and the slave SVC #1 become abnormal, then the degeneration process unit 44 is instructed to stop the entire system from the decision unit 43. In this case, the degeneration process unit 44 may stop the storage apparatus system, for example, by performing shutdown of the storage apparatus system. As an example, the degeneration process unit 44 may cause pseudo power outage of the storage apparatus system to shut down the storage apparatus system.

By such shutdown of the storage apparatus system, occurrence of a significant failure in the storage apparatus system can be suppressed and the availability of the storage apparatus system can be improved. It is to be noted that, for the technique for shutdown, various known techniques are applicable, and detailed description of them is omitted herein.

The incorporation process unit 46 may perform a re-incorporation process for incorporating a unit into the storage apparatus system again in accordance with an instruction from the decision unit 43.

The re-incorporation process may include a process for setting the status of the recovered unit to valid in the configuration information 45a.

As an example, the incorporation process unit 46 may validate the recovered unit, for example, by setting the status of the entry of the "SVC #1" to a value that signifies validity such as "online".

As described above, with the storage apparatus 1 according to the embodiment, the relay apparatus 2 that includes a plurality of MPs 20 each including FRTs 22 and an SVC 23 is provided newly in addition to the CEs 3 and the DEs 5. In such a configuration as just described, it is important for the improvement of the availability of the storage apparatus system to degenerate an abnormal part in the relay apparatus 2 with certainty to prevent, for example, occurrence of a secondary failure or the like.

Therefore, in the embodiment, for example, each CM 4 is notified of information relating to an abnormal state detected by the SVC 23 and performs a degeneration process for the abnormal part through a route from the CE 3 to a plurality of SVCs 23. Consequently, the SVC 23 that performs monitoring in the relay apparatus 2 detects an abnormal state in the relay apparatus 2, and the CM 4 that performs control of the storage apparatus 1 may degenerate the abnormal part with certainty.

Further, the CM 4 may store and manage management information (configuration information 45a) for managing the status of the storage apparatus 1. Therefore, since a degeneration process and a re-incorporation process are performed by the CM 4, specification of an abnormal part (degeneration target) can be performed readily and accurately, and information of units having been degenerated or re-incorporated can be managed centrally and the convenience in management of the storage apparatus system is high.

[1-4] Example of Operation of Storage Apparatus

Now, an example of operation when an abnormal state occurs in the relay apparatus 2 in the storage apparatus 1 configured in such a manner as described above and when the relay apparatus 2 is recovered from the abnormal state is described with reference to FIGS. 8 to 10. In the following, description is given focusing on the SVC 23 and the master CM 4 that detect an abnormal state and recovery from the abnormal state of the SVC 23 or the MP bridge 21 in the different system.

[1-4-1] Abnormal State of Different System SVC 23

First, a process when an abnormal state occurs with the different system SVC 23 is described with reference to FIG. 8.

Figure 8:
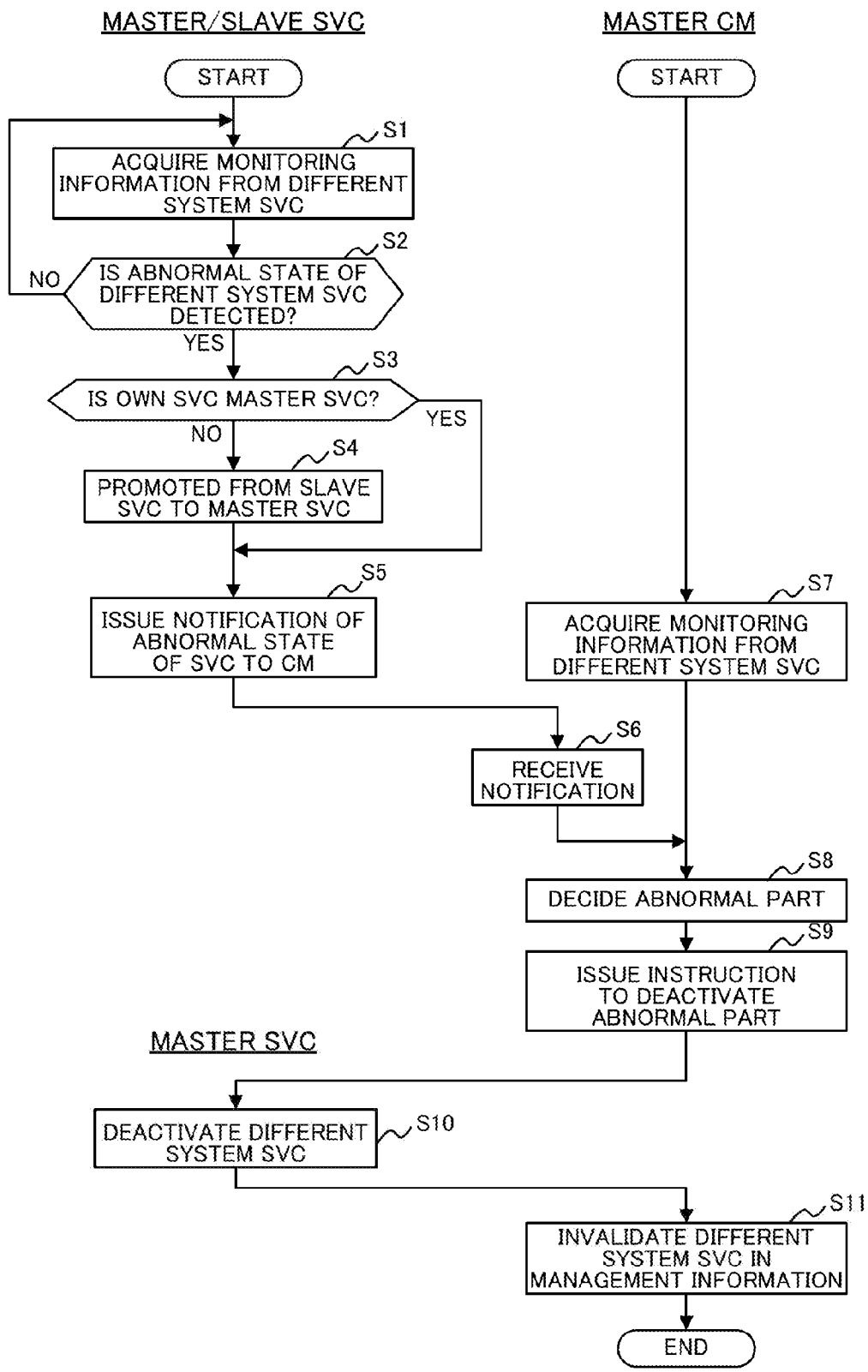
FIG. 8 is a flow chart illustrating an example of a process when the SVC of a different system in the storage apparatus according to the embodiment enters an abnormal state.

As depicted in FIG. 8, the information acquisition unit 231 of the SVC 23 acquires monitoring information from the relay apparatus 2 (for example, from the SVC 23 of the different system) (step S1) and outputs a result of the monitoring to the abnormal state detection unit 232. It is to be noted that the monitoring information acquired at this time may include a reception result of the heartbeat, presence or absence of the input power, status information, a notification of an abnormal state, a measurement value and so forth relating to the SVC 23 of the different system.

Then, the abnormal state detection unit 232 decides whether or not the monitoring information indicates an abnormal state of the SVC 23 of the different system (step S2). If the monitoring information does not indicate an abnormal state (if an abnormal state of the SVC 23 of the different system is not detected) (No at step S2), then the processing advances to step S1.

On the other hand, if the monitoring information indicates an abnormal state of the different system SVC 23 (if an abnormal state of the different system SVC 23 is detected) (Yes at step S2), then the abnormal state detection unit 232 generates information relating to the abnormal state from the monitoring information and outputs the generated information to the notification unit 233. It is to be noted that the information relating to the abnormal state may include a type of the detected abnormal state, for example, the power outage, an abnormal state of the heartbeat or an abnormal notification, and information relating to the abnormal part, for example, the SVC 23 of the different system.

When the information relating to the abnormal state is inputted, the notification unit 233 decides whether or not the SVC 23 itself is the master SVC 23 (step S3). If the SVC 23 itself is the master SVC 23 (Yes at step S3), then the processing advances to step S5. On the other hand, if the SVC 23 itself is not the master SVC 23 (if the SVC 23 itself is a slave SVC 23) (No at step S3), then the notification unit 233 promotes the own SVC 23 from the slave SVC 23 to the master SVC 23 (step S4), and then the processing is advanced to step S5.

At step S5, the notification unit 233 notifies the master CM 4 (and the salve CMs 4) of the information relating to the abnormal state.

The notification reception unit 42 of the master CM 4 receives the notification of the information relating to the abnormal state from the notification unit 233 (step S6), and at a timing before, after or of the timing of processing at step S6, the information acquisition unit 41 of the master CM 4 acquires monitoring information from the different system SVC 23 (step S7).

The decision unit 43 decides an abnormal part on the basis of a notification from the notification reception unit 42 or the monitoring information from the information acquisition unit 41 (step S8). Then, the decision unit 43 issues a notification of the decided abnormal part (in this case, the different system SVC 23) as a degeneration target. The degeneration process unit 44 instructs the master SVC 23 to stop the degeneration target in the notification (step S9).

The degeneration unit 234 of the master SVC 23 stops the different system SVC 23 in accordance with the instruction from the degeneration process unit 44 of the master CM 4 (step S10) and notifies the master CM 4 of completion of the stopping.

When the notification of completion of the stopping is received from the master SVC 23, the degeneration process unit 44 of the CM 4 invalidates (sets an invalidation value to) the status of the different system SVC 23 that is the degeneration target in the configuration information 45a (step S11), thereby ending the processing. It is to be noted that, although operation is continued in the system of the master SVC 23, if the different system SVC 23 is actively replaced, then operation by the two systems is continued.

It is to be noted that, if a unit other than the SVC 23 in the other system becomes abnormal, then the master SVC 23 that detects the abnormal state may notify the CMs 4 of information relating to the abnormal state. Then, the master CM 4 may cause the SVC 23 of the different system to degenerate an abnormal unit (in the case of, for example, an FRT 22) and invalidate the configuration information 45a of the abnormal unit (where the abnormal unit is an FRT 22, a fan unit 24 or a PSU 25).

[1-4-2] Abnormal State of MP Bridge 21

Now, a process when an abnormal state occurs with the MP bridge 21 is described with reference to FIG. 9.

As depicted in FIG. 9, the information acquisition unit 231 of the master SVC 23 acquires monitoring information from the relay apparatus 2 (for example, from the MP bridge 21) (step S21) and outputs a result of the monitoring to the abnormal state detection unit 232. It is to be noted that the monitoring information acquired at this time may be status information relating to the MP bridge 21, for example, an unmounting notification and so forth.

Then, the abnormal state detection unit 232 decides whether or not the monitoring information indicates an abnormal state of the MP bridge 21 (step S22). If the monitoring information does not indicate an abnormal state of the MP bridge 21 (if an abnormal state of the MP bridge 21 is not detected) (No at step S22), then the processing advances to step S21.

On the other hand, if the monitoring information indicates an abnormal state of the MP bridge 21 (if an abnormal state of the MP bridge 21 is detected) (Yes at step S22), then the abnormal state detection unit 232 generates information relating to the abnormal state from the monitoring information and outputs the generated information to the notification unit 233. It is to be noted that the information relating to the abnormal state may include information of a notification of a type of the detected abnormal state, for example, the abnormal state (unmounting) and so forth, and information relating to the abnormal part, for example, the MP bridge 21.

When the information relating to the abnormal state of the MP bridge 21 is inputted, the notification unit 233 suppresses notification of the abnormal state regarding the slave SVC 23 (for example, units under slave SVC 23) to the master CM 4 (step S23). It is to be noted that the type of the notification of the abnormal state suppressed here may be limited to an unmounting notification. Then, the notification unit 233 notifies the master CM 4 of the information relating to the abnormal state of the MP bridge 21 (step S24).

The notification reception unit 42 of the master CM 4 receives the notification of the information relating to the abnormal state from the notification unit 233 (step S25).

The decision unit 43 decides on the basis of the notification from the notification reception unit 42 that the abnormal part is the MP bridge 21 and then decides whether or not the slave SVC 23 is abnormal (step S26). The decision can be performed depending upon whether or not the abnormal state of the slave SVC 23 is detected on the basis of other information from the notification reception unit 42 or the information acquisition unit 41, or by referring to the configuration information 45a.

If also the slave SVC 23 is abnormal (Yes at step S26), then in order to prevent later occurrence of a significant failure, the decision unit 43 instructs the degeneration process unit 44 to stop the storage apparatus system and the degeneration process unit 44 artificially stops the power supply to the storage apparatus system (step S27) to perform shutdown, thereby ending the processing.

On the other hand, if the slave SVC 23 is not abnormal (No at step S26), then the decision unit 43 decides whether or not an undegenerated FRT 22 exists under the slave SVC 23 (step S28). This decision may be performed by referring to the configuration information 45a.

If an undegenerated FRT 22 does not exist (No at step S28), then the decision unit 43 instructs all units in the system that includes the slave SVC 23 to perform a degeneration process, whereafter the processing advances to step S31.

On the other hand, if an undegenerated FRT 22 exists (Yes at step S28), then the decision unit 43 instructs the degeneration process unit 44 to perform a degeneration process for all units in the system that includes the undegenerated FRT 22 and SVC 23.

Then, the degeneration process unit 44 instructs the slave SVC 23 to stop the undegenerated FRT 22 first (step S29), and then the degeneration unit 234 of the slave SVC 23 stops the undegenerated FRT 22 in accordance with an instruction from the degeneration process unit 44 (step S30). Then, the degeneration unit 234 of the slave SVC 23 notifies the master CM 4 of completion of the stopping, whereafter the processing advances to step S31.

At step S31, the degeneration process unit 44 of the master CM 4 instructs the slave SVC 23 to stop the slave SVC 23 (the SVC 23 itself). The degeneration unit 234 of the slave SVC 23 stops the slave SVC 23 itself in accordance with the instruction from the degeneration process unit 44 (step S32).

The degeneration process unit 44 of the master SVC 23 sets the status of all units under the slave SVC 23 that is a target of degeneration to invalid (step S33), thereby ending the processing. It is to be noted that the degeneration process unit 44 may set the status of the MP bridge 21 to invalid in the configuration information 45a to invalid.

[1-4-3] Recovery of MP Bridge 21

Now, a process when the MP bridge 21 is recovered is described with reference to FIG. 10.

As depicted in FIG. 10, the information acquisition unit 231 of the master SVC 23 acquires monitoring information from the relay apparatus 2 (for example, from the MP bridge 21) (step S41) and outputs a result of the monitoring to the abnormal state detection unit 232. It is to be noted that the monitoring result acquired at this time may include status information relating to the MP bridge 21, for example, a mounting notification and so forth.

Then, the abnormal state detection unit 232 decides whether or not the monitoring information indicates recovery of the MP bridge 21 (step S42). If the monitoring information does not indicate recovery of the MP bridge 21 (does not detect recovery of the MP bridge 21) (No at step S42), then the processing advances to step S41.

On the other hand, if the monitoring information indicates recovery of the MP bridge 21 (if recovery of the MP bridge 21 is detected) (Yes at step S42), then the abnormal state detection unit 232 generates information indicating that the abnormal part is recovered from the monitoring information and outputs the generated information to the notification unit 233. It is to be noted that the information indicating that the abnormal part is recovered may include the type of the detected information, for example, a notification of the recovery (mounting) or the like, and information relating to the recovery part, for example, the MP bridge 21.

When the information that the abnormal part relating to the MP bridge 21 is recovered is inputted, the notification unit 233 cancels the suppression of abnormal state notification regarding the units under the slave SVC 23 to the master CM 4 (step S43) and notifies the master CM 4 of information that the MP bridge 21 is recovered (step S44).

The notification reception unit 42 of the CM 4 receives the notification of the information indicating that the abnormal part is recovered from the notification unit 233 (step S45).

The decision unit 43 notifies, on the basis of the notification from the notification reception unit 42, the incorporation process unit 46 of an indication that the MP bridge 21 is recovered, and instructs the incorporation process unit 46 to perform a re-incorporation process into the storage apparatus system. The incorporation process unit 46 sets the status of the MP bridge 21 that is a re-incorporation target in the configuration information 45*a* to valid and successively sets the status of the units that receive the recovery notification other than the MP bridge 21 to valid (step S46), thereby ending the processing.

[2] Others

Although the preferred embodiment of the disclosure has been described in detail, the present disclosure is not restricted to the specific embodiment but can be carried out in various modified and altered forms without departing from the spirit and scope of the disclosure.

For example, the functional blocks of the CM 4 of the SVC 23 depicted in FIG. 4 and the functional blocks of the CM 4 depicted in FIG. 6 may be merged in a suitable combination or may be divided arbitrarily.

Further the number of MPs 20 in the relay apparatus 2, the number of FRTs 22 in the MP 20 and the number of CMs 4 in the CE 3 are not limited to two but may be one or three or more. It is to be noted that, where three or more MPs 20 are provided in the relay apparatus 2, also the number of MP bridge 21 may be two or more.

Further, the numbers of the IFs 4*d*-1 and the EXPs 4*h* in the CM 4 may be two or more, and the number of the IFs 4*d*-2 may be equal to or smaller than 2 or equal to or greater than 5, and the number of IOCs 4*g* may be one or three or more.

Further, the cascade connection number of the DE 5 is not limited to 4 but may be equal to or smaller than 3 or equal to or greater than 5.

According to the one aspect, the availability of the storage apparatus 1 can be improved.

All examples and conditional language recited provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage apparatus, comprising:
a plurality of control devices configured to control access from an upper apparatus to a plurality of storage devices; and
a relay apparatus including a plurality of coupling devices, each of the plurality of coupling devices being configured to couple the plurality of control devices so as to be communicatable with each other; wherein
the relay apparatus includes, for each of the coupling devices, a monitoring controller configured to perform monitoring of the relay apparatus;
a first monitoring controller provided in a first coupling device from among the plurality of coupling devices notifies, when the first monitoring controller detects an abnormal state in the relay apparatus, a first control device from among the plurality of control devices of information relating to the abnormal state detected by the first monitoring controller; and
the first control device performs a decoupling process that decouples an abnormal part from the relay apparatus based on the information relating to the abnormal state received from the first monitoring controller.

2. The storage apparatus according to claim 1, wherein the relay apparatus further includes a bridge module configured to couple the plurality of coupling devices so as to be communicatable with each other; and
when the first control device decides based on the information relating to the abnormal state received from the first monitoring controller that the abnormal part is the bridge module, the first control device performs, for a second coupling device coupled to the first coupling device through the bridge module, a decoupling process that decouples a plurality of modules including a second monitoring controller provided in the second coupling device from the relay apparatus.

3. The storage apparatus according to claim 2, wherein, when the first control device decides that the abnormal part is the bridge module, the first control device controls, in the decoupling process, the second monitoring controller to deactivate a module provided in the second coupling device, and deactivate the second monitoring controller, after the module is deactivated.

4. The storage apparatus according to claim 3, wherein, when the first control device decides based on the information relating to the abnormal state received from the first monitoring controller that the abnormal part is the bridge module and the second monitoring controller, the first control device performs a deactivation process that deactivates the storage apparatus.

5. The storage apparatus according to claim 1, wherein the first control device monitors each of the plurality of monitoring controllers and performs decision of the abnormal part based on a monitoring result and the information relating to the abnormal state received from the first monitoring controller.

6. The storage apparatus according to claim 1, wherein, when a second monitoring controller provided in a second coupling device from among the plurality of coupling devices detects an abnormal state of one or more modules including the first monitoring controller in the first coupling device, the second monitoring controller acquires authority to notify the first control device of the information relating to the abnormal state detected by the second monitoring controller and notifies the first control device of the information relating to the abnormal state.

7. The storage apparatus according to claim 1, wherein the decoupling process includes:
transmitting an instruction to deactivate operation of the abnormal part to: the first monitoring controller; or the monitoring controller of the coupling device that includes the abnormal part, and
setting a state of a module corresponding to the abnormal part in management information so as to be invalid, the management information representing a state of the storage apparatus and being managed by the first control device.

8. The storage apparatus according to claim 1, wherein, when the first monitoring controller recognizes that a module corresponding to the module decoupled from the relay apparatus by the decoupling process is coupled with the relay apparatus, the first monitoring controller notifies the first control device of information representing that the module is coupled, and
the first control device sets, based on the information representing that the module is coupled, a state of the module in management information so as to be valid, the management information representing a state of the storage apparatus and being managed by the first control device.

9. A control device served as a first control device comprising:
a processor; wherein
the control device controls access from an upper apparatus to a plurality of storage devices,
the control device is included in a storage apparatus that includes a plurality of control devices and a relay apparatus,
the relay apparatus includes a plurality of coupling devices,
each of the coupling devices is configured to couple the plurality of control devices so as to be communicatable with each other,
the relay apparatus includes, for each of the coupling devices, a monitoring controller configured to perform monitoring of the relay apparatus, and
the processor
receives, from a first monitoring controller provided in a first coupling device from among the plurality of coupling devices, information relating to an abnormal state in the relay apparatus detected by the first monitoring controller; and
performs a decoupling process that decouples the abnormal part from the relay apparatus based on the information relating to the abnormal state received from the first monitoring controller.

10. A non-transitory computer-readable recording medium having stored therein a control program for causing a first computer to execute a process for controlling a storage apparatus, the process comprising:
controlling access from an upper apparatus to a plurality of storage devices, the first computer being included in the storage apparatus that includes a plurality of computers and a relay apparatus, the relay apparatus including a plurality of coupling devices, each of the coupling devices being configured to couple the plurality of computers so as to be communicatable with each other, and the relay apparatus including, for each of the coupling devices, a monitoring controller configured to perform monitoring of the relay apparatus;
receiving, from a first monitoring controller from among a plurality of monitoring controllers, information relating to an abnormal state in the relay apparatus detected by the first monitoring controller, the first monitoring controller being included in a first coupling device; and
performing a decoupling process that decouples the abnormal part from the relay apparatus based on the information relating to the abnormal state received from the first monitoring controller.

* * * * *